United States Patent
Tanaka et al.

(10) Patent No.: US 10,074,333 B2
(45) Date of Patent: Sep. 11, 2018

(54) DISPLAY DEVICE AND METHOD FOR DRIVING SAME

(71) Applicant: Sharp Kabushiki Kaisha, Sakai, Osaka (JP)

(72) Inventors: Noriyuki Tanaka, Sakai (JP); Kazuo Nakamura, Sakai (JP); Takuya Sone, Sakai (JP); Jin Miyazawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/510,258

(22) PCT Filed: Sep. 10, 2015

(86) PCT No.: PCT/JP2015/075685
§ 371 (c)(1),
(2) Date: Mar. 10, 2017

(87) PCT Pub. No.: WO2016/043112
PCT Pub. Date: Mar. 24, 2016

(65) Prior Publication Data
US 2017/0263204 A1    Sep. 14, 2017

(30) Foreign Application Priority Data
Sep. 17, 2014    (JP) ................................ 2014-188944

(51) Int. Cl.
*G09G 3/36*    (2006.01)
*G02F 1/1345*    (2006.01)

(52) U.S. Cl.
CPC ......... *G09G 3/3677* (2013.01); *G09G 3/3648* (2013.01); *G09G 3/3688* (2013.01);
(Continued)

(58) Field of Classification Search
CPC ............... G09G 3/3677; G09G 3/3648; G09G 2300/0408; G09G 2310/0272;
(Continued)

(56) References Cited

U.S. PATENT DOCUMENTS

2001/0013850 A1* 8/2001 Sakaguchi ........... G09G 3/3611
 345/87
2002/0180684 A1* 12/2002 Saitou .................. G09G 3/3614
 345/98

(Continued)

FOREIGN PATENT DOCUMENTS

JP    2001-324965 A    11/2001
JP    2005-196008 A    7/2005
(Continued)

OTHER PUBLICATIONS

Tanaka, N. et al; "Display Device and Method for Driving Same"; U.S. Appl. No. 15/033,682, filed May 2, 2016.
(Continued)

*Primary Examiner* — Stephen G Sherman
(74) *Attorney, Agent, or Firm* — Keating & Bennett, LLP

(57) ABSTRACT

In the present invention, occurrence of abnormality such as display misalignment at the time of image update is prevented even when pause drive is performed in a display device where data signal lines are driven by a plurality of driver ICs. In a liquid crystal display device which includes a master IC (300L) and a slave IC (300R) as driver ICs and performs pause drive, upon detection of refresh start timing by a REF (Half) of the master IC (300L), the master IC (300L) transmits a refresh control signal RfC to the slave IC (300R), and upon receipt of a refresh detection signal RfD indicating refresh start timing detected by a REF (Half) of the slave IC (300R), the master IC (300L) transmits the refresh control signal RfC to the slave IC (300R) as well as starts refreshing on the left active area based on data in a 1/2
(Continued)

RAM (306L). Upon receipt of the refresh control signal RfC, the slave IC (300R) starts refreshing on a right active area based on data in a 1/2 RAM (306R).

19 Claims, 18 Drawing Sheets

(52) U.S. Cl.
CPC . *G02F 1/13454* (2013.01); *G09G 2300/0408* (2013.01); *G09G 2310/0272* (2013.01); *G09G 2310/0281* (2013.01); *G09G 2310/08* (2013.01); *G09G 2340/0435* (2013.01); *G09G 2340/16* (2013.01); *G09G 2370/08* (2013.01)

(58) Field of Classification Search
CPC ........... G09G 2310/08; G09G 2340/16; G09G 2370/08; G09G 2330/02; G09G 2330/021
See application file for complete search history.

(56) References Cited

U.S. PATENT DOCUMENTS

| | | |
|---|---|---|
| 2006/0007114 A1 | 1/2006 | Shiraishi |
| 2008/0018582 A1 | 1/2008 | Yang et al. |
| 2012/0138922 A1 | 6/2012 | Yamazaki et al. |
| 2014/0049533 A1 | 2/2014 | Saitoh et al. |
| 2014/0125569 A1 | 5/2014 | Nakata et al. |
| 2015/0116300 A1 | 4/2015 | Yamaki et al. |
| 2015/0235624 A1 | 8/2015 | Asai et al. |

FOREIGN PATENT DOCUMENTS

| | | |
|---|---|---|
| JP | 2006-053527 A | 2/2006 |
| JP | 2012-134475 A | 7/2012 |
| JP | 2013-168083 A | 8/2013 |
| TW | 200808064 A | 2/2008 |
| WO | 2012/147703 A1 | 11/2012 |
| WO | 2013/008668 A1 | 1/2013 |
| WO | 2013/153987 A1 | 10/2013 |
| WO | 2014/038319 A1 | 3/2014 |

OTHER PUBLICATIONS

Official Communication issued in International Patent Application No. PCT/JP2015/075685, dated Dec. 15, 2015.

* cited by examiner

DISPLAY DEVICE AND METHOD FOR DRIVING SAME

TECHNICAL FIELD

The present invention relates to a display device and a method for driving the display device, and particularly relates to a display device that performs pause drive and a method for driving the display device.

BACKGROUND ART

A plurality of pixel formation portions are formed in a matrix form in a display portion of an active matrix-type liquid crystal display device. Each pixel formation portion is provided with a thin film transistor (hereinafter referred to as the "TFT") that operates as a switching element, and a pixel capacitance connected to a data signal line via the TFT. By turning on and off this TFT, a data signal for displaying an image is written as a data voltage into the pixel capacitance in the pixel formation portion. This data voltage is applied to a liquid crystal layer of the pixel formation portion to change an orientation direction of liquid crystal molecules in accordance with a voltage value of the data signal. In this manner, the liquid crystal display device controls a light transmittance of the liquid crystal layer in each pixel formation portion to display an image on the display portion.

Such a liquid crystal display device has conventionally been required to reduce its power consumption in the case of being used in mobile electronic equipment or the like. There has thus been proposed a display device driving method of setting a scanning period in which gate lines as scanning signal lines of the liquid crystal display device are scanned to refresh a display image (such a scanning period will also be referred to as the "refresh period"), and thereafter setting a pause period in which all gate lines are brought into a non-scanning state to pause the refresh (such a pause period will also be referred to as "non-refresh period") (e.g., see Patent Document 1). During this pause period, for example, a signal for control can be prevented from being provided to a gate driver as a scanning signal line drive circuit and/or a source driver as a data signal line drive circuit. Since operations of the gate driver and/or the source driver can thus be paused, power consumption can be reduced. The drive such as the one disclosed in Patent Document 1, or the drive which is performed by setting the pause period after the refresh period, is called "pause drive", for example. In addition, such pause drive is also referred to as "low-frequency drive" or "intermittent drive". Such pause drive is suitable for still image display.

PRIOR ART DOCUMENT

Patent Document

[Patent Document 1] WO 2013/008668

SUMMARY OF THE INVENTION

Problems to be Solved by the Invention

In recent years, with regard to a liquid crystal display device for mobile electronic equipment, there has been provided an IC (Integrated Circuit) realized as one chip by integration of a drive circuit such as a source driver for driving a display portion of a liquid crystal panel and a timing controller (hereinafter abbreviated as the "ICON") as a display control circuit for generating a control signal for the drive circuit. Such an IC is called a "one-chip driver", a "system driver", or the like.

Meanwhile, since resolution of the display device for mobile electronic equipment is in increase, it may not be possible for only the source driver included in the one-chip driver to drive all source lines. In this case, a plurality of driver ICs each having a ICON built therein in addition to a drive circuit, as does the one-chip driver, are considered to be used so as to make high-resolution display on the liquid crystal display device.

However, in the liquid crystal display device using a plurality of driver ICs as described above, abnormality such as display misalignment may occur when an image is updated during pause drive.

Therefore, an object of the present invention is to provide a display device that is free of occurrence of abnormality such as display misalignment at the time of image update even when pause drive is performed in a configuration where a plurality of driver ICs drive (data signal lines of) a display portion.

Means for Solving the Problems

A first aspect of the present invention provides a display device for displaying an image based on input data provided from outside, the device including:

a display portion for displaying the image;

a drive control portion for driving the display portion based on the input data so as to alternate between a refresh period in which a display image on the display portion is refreshed and a non-refresh period in which refresh of the display image on the display portion is paused; and a data path for providing the input data from the outside to the drive control portion, wherein the drive control portion includes a plurality of drive control circuits that respectively correspond to a plurality of sub display areas obtained by dividing a display area of the display portion, each of the drive control circuits includes a rewritable memory, each of the drive control circuits, when receiving data to be provided thereto from among the input data, stores in the memory as drive data at least data for displaying an image in a sub display area corresponding to the relevant drive control circuit from among the received data, and when data for refreshing the display image on the display portion is provided as the input data from the outside, each of the drive control circuits acquires refresh start information, which is associated with refresh start timing based on the input data, in the relevant drive control circuit based on the input data, or from the other drive control circuit or the outside, and drives the display portion based on the drive data stored in the memory such that refresh of a display image in the sub display area corresponding to each of the drive control circuits is started in synchronization with refresh of a display image in the sub display area corresponding to the other drive control circuit based on the acquired refresh start information.

A second aspect of the present invention provides the display device according to the first aspect of the present invention, wherein the data path includes a plurality of sub data paths respectively corresponding to the plurality of sub display areas, and each of the drive control circuits receives, as sub input data from among the input data, data for displaying an image in the corresponding sub display area from the outside via the sub data path corresponding to the sub display area concerned, and stores the received sub input data in the memory as the drive data.

A third aspect of the present invention provides the display device according to the first aspect of the present invention, wherein each of the drive control circuits receives the input data from the outside via the data path.

A fourth aspect of the present invention provides the display device according to the first aspect of the present invention, wherein the display portion includes:

a plurality of data signal lines;

a plurality of scanning signal lines that intersect with the plurality of data signal lines; and a plurality of pixel formation portions arranged in a matrix form along the plurality of data signal lines and the plurality of scanning signal lines, each of the pixel formation portions is connected to any one of the plurality of data signal lines and connected to any one of the plurality of scanning signal lines, the drive control portion drives the plurality of data signal lines and the plurality of scanning signal lines such that an image is displayed by the plurality of pixel formation portions based on the input data, the data path includes:

an odd sub data path for transferring, as odd column data from among the input data, data corresponding to an odd-numbered pixel column made up of pixels aligned along each of the data signal lines in a pixel matrix constituting an image to be displayed by the plurality of pixel formation portions, from the outside to each of the drive control circuits, and an even sub data path for transferring, as even column data from among the input data, data corresponding to an even-numbered pixel column made up of pixels aligned along each of the data signal lines in the pixel matrix, from the outside to each of the drive control circuits, and each of the drive control circuits receives the odd column data from the outside via the odd sub data path, and receives the even column data from the outside via the even sub data path, thereby being provided from the outside with the input data for each one-line data corresponding to one pixel row made up of pixels aligned along each of the scanning signal lines in the pixel matrix.

A fifth aspect of the present invention provides the display device according to the first aspect of the present invention, wherein the display portion includes:

a plurality of data signal lines;

a plurality of scanning signal lines that intersect with the plurality of data signal lines; and a plurality of pixel formation portions arranged in a matrix form along the plurality of data signal lines and the plurality of scanning signal lines, each of the pixel formation portions is connected to any one of the plurality of data signal lines and connected to any one of the plurality of scanning signal lines, the drive control portion drives the plurality of data signal lines and the plurality of scanning signal lines such that an image is displayed by the plurality of pixel formation portions based on the input data, the data path includes:

an odd sub data path for transferring, as odd row data from among the input data, data corresponding to an odd-numbered pixel row made up of pixels aligned along each of the scanning signal lines in a pixel matrix constituting an image to be displayed by the plurality of pixel formation portions, from the outside to each of the drive control circuits, and an even sub data path for transferring, as even row data from among the input data, data corresponding to an even-numbered pixel row made up of pixels aligned along each of the scanning signal lines in the pixel matrix, from the outside to each of the drive control circuits, and each of the drive control circuits receives the odd row data from the outside via the odd sub data path, and receives the even row data from the outside via the even sub data path, thereby being provided from the outside with the input data for each two-line data corresponding to two pixel rows made up of pixels aligned along each of the data signal lines in the pixel matrix.

A sixth aspect of the present invention provides the display device according to any one of the third to fifth aspects of the present invention, wherein when receiving the input data from the outside, each of the drive control circuits stores, in the memory as the drive data, data for displaying an image in the corresponding sub display area from among the input data.

A seventh aspect of the present invention provides the display device according to any one of the third to fifth aspects of the present invention, wherein when receiving the input data from the outside, each of the drive control circuits stores the input data in the memory as the drive data.

A eighth aspect of the present invention provides the display device according to any one of the second to seventh aspects of the present invention, wherein each of the drive control circuits includes a refresh detection portion for detecting refresh start timing for the display image on the display portion based on data for displaying an image in the corresponding sub display area from among the input data, the plurality of drive control circuits are made up of one drive control circuit identified as a master drive control circuit, and a drive control circuit which is other than the master drive control circuit and identified as a slave drive control circuit, a signal path is provided between the master drive control circuit and the slave drive control circuit, upon detection of the refresh start timing by the refresh detection portion, the slave drive control circuit transmits a refresh detection signal indicating the refresh start timing as the refresh start information to the master drive control circuit via the signal path, upon detection of the refresh start timing by the refresh detection portion, or upon receipt of the refresh detection signal from the slave drive control circuit via the signal path, the master drive control circuit transmits a refresh control signal instructing starting of the refresh as the refresh start information to the slave drive control circuit via the signal path, and drives the display portion such that refresh of the display image in the corresponding sub display area is started based on the drive data stored in the memory in the master drive control circuit, and upon receipt of the refresh control signal from the master drive control circuit via the signal path, the slave drive control circuit drives the display portion such that refresh of the display image in the corresponding sub display area is started based on the drive data stored in the memory in the slave drive control circuit.

A ninth aspect of the present invention provides the display device according to any one of the third to seventh aspects of the present invention, wherein the plurality of drive control circuits are made up of one drive control circuit identified as a master drive control circuit, and a drive control circuit which is other than the master drive control circuit and identified as a slave drive control circuit, a signal path is provided between the master drive control circuit and the slave drive control circuit, the master drive control circuit includes a refresh detection portion for detecting refresh start timing for the display image on the display portion based on the input data, upon detection of the refresh start timing by the refresh detection portion, the master drive control circuit transmits a refresh control signal instructing starting of the refresh as the refresh start information to the slave drive control circuit via the signal path, and drives the display portion such that refresh of the display image in the corresponding sub display area is started based on the drive data stored in the memory in the master drive control circuit, and upon receipt of the refresh control signal from the master drive control circuit via the signal path, the slave drive control circuit drives the display portion such that refresh of the display image in the corresponding sub display area is started based on the drive data stored in the memory in the slave drive control circuit.

A tenth aspect of the present invention provides the display device according to any one of the second to seventh aspects of the present invention, further including a signal path for connecting the plurality of drive control circuits to each other, wherein each of the drive control circuits includes a refresh detection portion for detecting refresh start timing for the display image on the display portion based on data for displaying an image in the corresponding sub display area from among the input data, upon detection of the refresh start timing by the refresh detection portion, each of the drive control circuits transmits a refresh detection signal indicating the refresh start timing as the refresh start information to the other drive control circuit via the signal path, and drives the display portion such that refresh of the display image in the corresponding sub display area is started based on the drive data stored in the memory in the relevant drive control circuit, and upon receipt of the refresh detection signal from any of the other drive control circuits via the signal path, each of the drive control circuits drives the display portion such that refresh of the display image in the corresponding sub display area is started based on the drive data stored in the memory in the relevant drive control circuit.

A eleventh aspect of the present invention provides the display device according to any one of the third to seventh aspects of the present invention, wherein each of the drive control circuits includes a refresh detection portion for detecting refresh start timing for the display image on the display portion based on the input data, and upon detection of the refresh start timing by the refresh detection portion, each of the drive control circuits drives the display portion such that refresh of the display image in the corresponding sub display area is started based on the drive data stored in the memory in the relevant drive control circuit.

A twelfth aspect of the present invention provides the display device according to any one of the second to seventh aspects of the present invention, further including a control signal path for receiving from the outside a refresh control signal as the refresh start information, the signal instructing starting of refresh of the display image on the display portion based on the input data, wherein, upon receipt of the refresh control signal from the outside via the control signal path, each of the drive control circuits drives the display portion such that refresh of the display image in the corresponding sub display area is started based on the drive data stored in the memory in the relevant drive control circuit.

A thirteenth aspect of the present invention provides the display device according to any one of the second to seventh aspects of the present invention, wherein each of the drive control circuits is configured as a single IC chip.

A fourteenth aspect of the present invention provides the display device according to any one of the second to seventh aspects of the present invention, wherein the display portion includes a thin film transistor having a channel layer formed of an oxide semiconductor, as a switching element for forming each pixel constituting an image to be displayed.

Descriptions of other aspects of the present invention are omitted since those aspects are apparent from the first to fourteenth aspects of the present invention described above and from descriptions of embodiments described later.

Advantages of the Invention

According to the first aspect of the present invention, when data for refreshing the display image on the display portion is provided as the input data from the outside, each of the drive control circuits acquires refresh start information, which is associated with refresh start timing based on the input data, in the drive control circuit based on the input data, or acquires it from the other drive control circuit or the outside. Further, each of the drive control circuits, when receiving data to be provided thereto, stores in the memory as drive data at least data for displaying an image in a sub display area corresponding to the relevant drive control circuit from among the received data, and based on the acquired refresh start information, each of the drive control circuits drives the display portion based on the drive data stored in the memory in the relevant drive control circuit such that refresh of a display image in the sub display area corresponding to each of the drive control circuits is started in synchronization with refresh of a display image in the sub display area corresponding to the other drive control circuit. Therefore, even when only the display image in any of the plurality of sub display areas of the display portion is to be changed, or even when the timings for data transfer or the like for refreshing the display images in the plurality of sub display areas are different from each other, refresh of the display image in the sub display area corresponding to each of the drive control circuits is started in synchronization with refresh of the display image in the sub display area corresponding to the other drive control circuit. Thus, abnormality such as display misalignment at the time of image update does not occur even when the display portion is driven by the plurality of drive control circuits. Hence in the display device that performs pause drive, the display portion is driven by a plurality of drive control circuits, thereby enabling favorable display of a high-resolution image.

According to the second aspect of the present invention, each of the drive control circuits receives, as sub input data from among the input data, data for displaying an image in the corresponding sub display area from the outside via the sub data path corresponding to the sub display area concerned, and stores the sub input data in the memory as drive data. Herein, when the input data is data for refreshing the display image on the display portion, based on the drive data stored in the memory, each of the drive control circuits drives the display portion such that refresh of the display image in the sub display area corresponding to the relevant drive control circuit is started in synchronization with refresh of the display image in the sub display area corresponding to the other drive control circuit. Thus, the second aspect of the present invention has an advantage of exerting a similar effect to that of the first aspect of the present invention, and having a low operation frequency for data transfer from the outside to each of the drive control circuits.

According to the third aspect of the present invention, each of the drive control circuits receives the input data from the outside via the data path, and stores in the memory as drive data at least data for displaying an image in a sub display area corresponding to the relevant drive control circuit from among the input data. Herein, when the input data is data for refreshing the display image on the display portion, based on the drive data stored in the memory, each of the drive control circuits drives the display portion such that refresh of the display image in the sub display area corresponding to the relevant drive control circuit is started in synchronization with refresh of the display image in the sub display area corresponding to the other drive control circuit. Hence it is possible to obtain a similar effect to that of the first aspect of the present invention.

According to the fourth aspect of the present invention, each of the drive control circuits receives, from among the input data, the odd column data from the outside via the odd sub data path, and receives the even column data from the outside via the even sub data path, and then stores in the memory as drive data at least data for displaying an image in a sub display area corresponding to the relevant drive control circuit from among the received data. Herein, when the input data is data for refreshing the display image on the display portion, based on the drive data stored in the memory, each of the drive control circuits drives the display portion such that refresh of the display image in the sub display area corresponding to the relevant drive control circuit is started in synchronization with refresh of the display image in the sub display area corresponding to the other drive control circuit. Thus, the fourth aspect of the present invention has an advantage of exerting a similar effect to that of the first aspect of the present invention, and having a low operation frequency for data transfer due to transfer of the input data to each of the drive control circuits via two-system data paths (the odd sub data path and the even sub data path).

According to the fifth aspect of the present invention, each of the drive control circuits receives, from among the input data, the odd row data from the outside via the odd sub data path, and receives the even row data from the outside via the even sub data path, and then stores in the memory as drive data at least data for displaying an image in a sub display area corresponding to the relevant drive control circuit from among the received data. Herein, when the input data is data for refreshing the display image on the display portion, based on the drive data stored in the memory, each of the drive control circuits drives the display portion such that refresh of the display image in the sub display area corresponding to the relevant drive control circuit is started in synchronization with refresh of the display image in the sub display area corresponding to the other drive control circuit. Thus, the fifth aspect of the present invention has an advantage of exerting a similar effect to that of the first aspect of the present invention, and having a low operation frequency for data transfer due to transfer of the input data to each of the drive control circuits via two-system data paths (the odd sub data path and the even sub data path).

According to the sixth aspect of the present invention, when receiving the input data from the outside, each of the drive control circuits stores data for displaying an image in the corresponding sub display area, in the memory as drive data from among the received data. Herein, when the input data is data for refreshing the display image on the display portion, based on the drive data stored in the memory, each of the drive control circuits drives the display portion such that refresh of the display image in the sub display area corresponding to the relevant drive control circuit is started in synchronization with refresh of the display image in the sub display area corresponding to the other drive control circuit. Thus, the sixth aspect of the present invention has an advantage of exerting a similar effect to that of the first aspect of the present invention.

According to the seventh aspect of the present invention, when receiving the input data from the outside, each of the drive control circuits stores the input data in the memory as drive data. Herein, when the input data is data for refreshing the display image on the display portion, based on the drive data stored in the memory, each of the drive control circuits drives the display portion such that refresh of the display image in the sub display area corresponding to the relevant drive control circuit is started in synchronization with refresh of the display image in the sub display area corresponding to the other drive control circuit. Thus, the seventh aspect of the present invention has an advantage of exerting a similar effect to that of the first aspect of the present invention.

According to the eighth aspect of the present invention, each of the drive control circuits, when receiving data to be provided thereto from among the input data, stores in the memory as drive data at least data for displaying an image in a sub display area corresponding to the relevant drive control circuit from among the received data. Upon detection of the refresh start timing by the refresh detection portion, or upon receipt of the refresh detection signal from the slave drive control circuit, the master drive control circuit transmits a refresh control signal instructing starting of the refresh to the slave drive control circuit, and drives the display portion such that refresh of the display image in the corresponding sub display area is started based on the drive data stored in the memory in the master drive control circuit. Further, upon detection of the refresh start timing by the refresh detection portion, the slave drive control circuit transmits a refresh detection signal indicating the start timing to the master drive control circuit, and upon receipt of the refresh control signal from the master drive control circuit, the slave drive control circuit drives the display portion such that refresh of the display image in the corresponding sub display area is started based on the drive data stored in the memory in the slave drive control circuit. Thereby, even when only the display image in any of the plurality of sub display areas of the display portion is to be changed, or even when the timings for data transfer or the like for refreshing the display images in the plurality of sub display areas are different from each other, refresh of the display image in the sub display area corresponding to each of the drive control circuits is started in synchronization with refresh of the display image in the sub display area corresponding to the other drive control circuit. Hence it is possible to obtain a similar effect to that of the first aspect of the present invention. Further, since the refresh start timing for the display image in the sub display area corresponding to each of the drive control circuits is substantially controlled only by the master drive circuit, the accuracy in synchronization of the refresh start timing is high.

According to the ninth aspect of the present invention, when receiving the input data, each of the drive control circuits stores in the memory as drive data at least data for displaying an image in a sub display area corresponding to the relevant drive control circuit from among the input data. Upon detection of the refresh start timing by the refresh detection portion, the master drive control circuit transmits a refresh control signal instructing starting of the refresh to the slave drive control circuit, and drives the display portion such that refresh of the display image in the corresponding sub display area is started based on the drive data stored in the memory in the master drive control circuit. Further, upon receipt of the refresh control signal from the master drive control circuit, the slave drive control circuit drives the display portion such that refresh of the display image in the corresponding sub display area is started based on the drive data stored in the memory in the slave drive control circuit. Hence it is possible to obtain a similar effect to that of the eighth aspect of the present invention.

According to the tenth aspect of the present invention, each of the drive control circuits, when receiving data to be provided thereto from among the input data, stores in the memory as drive data at least data for displaying an image in a sub display area corresponding to the relevant drive control circuit from among the received data. Further, upon detection of the refresh start timing by the refresh detection portion, each of the drive control circuits transmits a refresh detection signal indicating the start timing to the other drive control circuit, and drives the display portion such that refresh of the display image in the corresponding sub display area is started based on the drive data stored in the memory, or upon receipt of the refresh detection signal from any of the other drive control circuits, each of the drive control circuits drives the display portion such that refresh of the display image in the corresponding sub display area is started based on the drive data stored in the memory. Thereby, even when only the display image in any of the plurality of sub display areas of the display portion is to be changed, or even when the timings for data transfer or the like for refreshing the display image in the plurality of sub display areas are different from each other, refresh of the display image in the sub display area corresponding to each of the drive control circuits is started in synchronization with refresh of the display image in the sub display area corresponding to the other drive control circuit. Hence it is possible to obtain a similar effect to that of the first aspect of the present invention.

According to the eleventh aspect of the present invention, when receiving the input data, each of the drive control circuits stores in the memory as drive data at least data for displaying an image in a sub display area corresponding to the relevant drive control circuit from among the input data. Further, upon detection of the refresh start timing based on the input data by the refresh detection portion, the each of the drive control circuits drives the display portion such that refresh of the display image in the corresponding sub display area is started based on the drive data stored in the memory. Hence it is possible to obtain a similar effect to that of the first aspect of the present invention without transmitting or receiving a signal such as the refresh detection signal or the refresh control signal between the plurality of drive control circuits.

According to the twelfth aspect of the present invention, each of the drive control circuits, when receiving data to be provided thereto from among the input data, stores in the memory as drive data at least data for displaying an image in a sub display area corresponding to the relevant drive control circuit from among the received data. Further, upon receipt of the refresh control signal from the outside, each of the drive control circuits drives the display portion such that refresh of the display image in the corresponding sub display area is started based on the drive data stored in the memory. Thereby, each of the drive control circuits can start refresh of the display image in the sub display area corresponding thereto in synchronization with refresh of the display image in the sub display area corresponding to the other drive control circuit. Hence it is possible to obtain a similar effect to that of the first aspect of the present invention. Further, since synchronization of refresh for the plurality of sub display areas of the display portion is based on the refresh control signal from the outside, it is possible to reliably synchronize the refresh without transmitting or receiving a signal such as the refresh detection signal or the refresh control signal between the plurality of drive control circuits.

According to the thirteenth aspect of the present invention, a similar effect to that of the first aspect of the present invention is obtained, and the display portion is driven by use of a plurality of drive control circuits each configured as a single IC chip, thereby enabling favorable display of a high-resolution image.

According to the fourteenth aspect of the present invention, since the thin film transistor having the channel layer formed of the oxide semiconductor is used as the switching element for forming each pixel constituting an image to be displayed on the display portion, an off-leak current of the thin film transistor is significantly reduced, thereby enabling favorable pause drive of the display device.

Descriptions of effects of other aspects of the present invention are omitted since those effects are apparent from the effects of the first to fourteenth aspects of the present invention described above and from descriptions of embodiments described below.

MODES FOR CARRYING OUT THE INVENTION

Hereinafter, embodiments of the present invention are described. In each of the embodiments below, a description is given by taking as an example an active matrix-type liquid crystal display device that performs pause drive.

0. Basic Configuration

<0.1 Whole Configuration>

Prior to a description of each of the embodiments of the present invention, first, a configuration as a basis of each of the embodiments (hereinafter, "basic configuration") is described.

Figure 1:
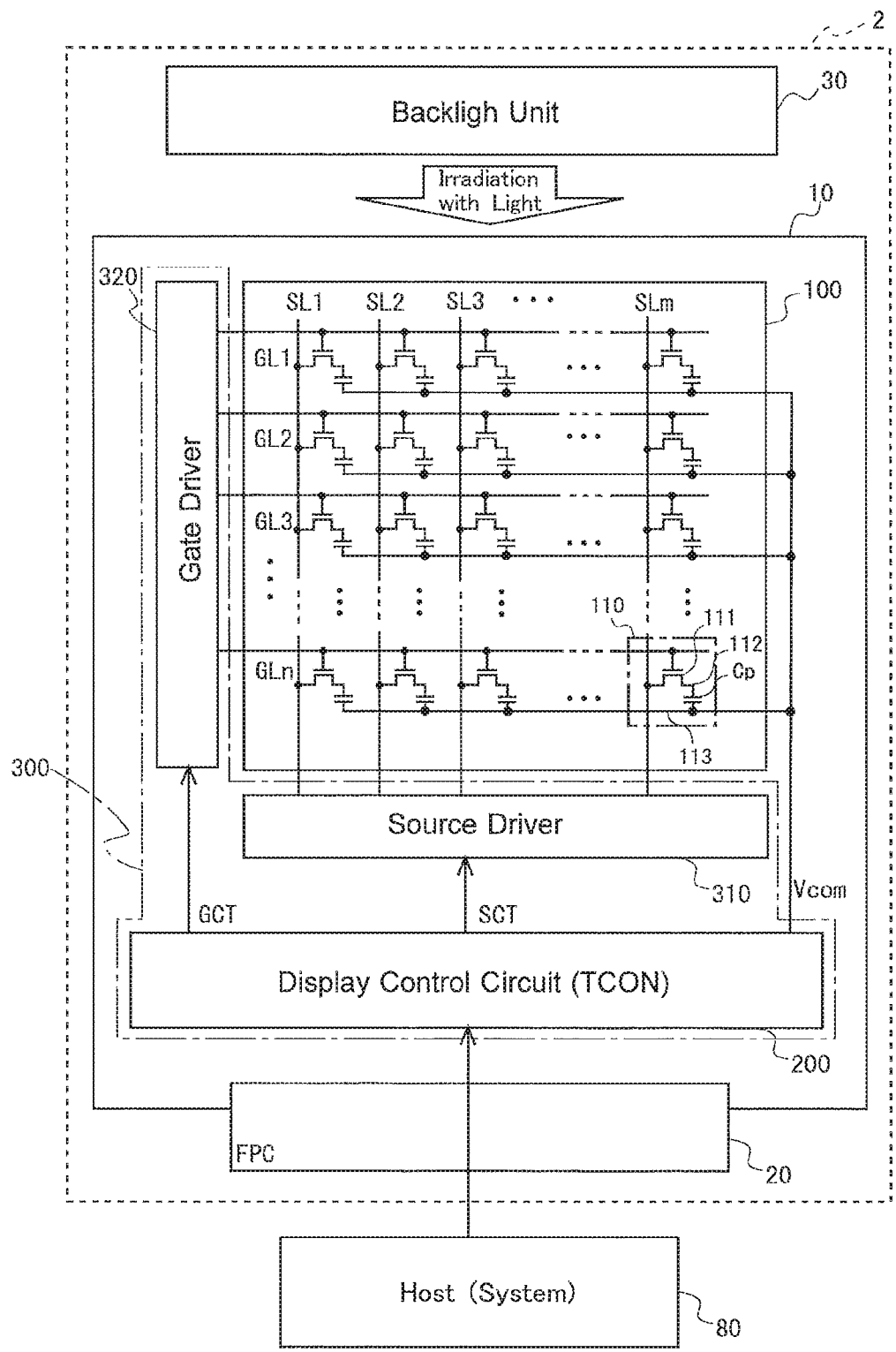
FIG. 1 is a block diagram showing a configuration example of a general liquid crystal display device.

FIG. 1 is a block diagram showing a configuration example of a general liquid crystal display device. This liquid crystal display device 2 includes a liquid crystal display panel 10 and a backlight unit 30. An FPC (Flexible Printed Circuit) for connection with the outside is provided in the liquid crystal display panel 10. Further, a display portion 100, a display control circuit 200, a source driver 310 as a data signal line drive circuit, and a gate driver 320 as a scanning signal line drive circuit are provided on the liquid crystal display panel 10. It is to be noted that the source driver 310, the gate driver 320, and the display control circuit 200 constitute the drive control portion in the present invention, and both the source driver 310 and the gate driver 320 or either of them may be provided in the display control circuit 200. Further, both the source driver 310 and the gate driver 320 or either of them may be integrally formed with the display portion 100. A host 80 (system) mainly made up of a CPU is provided outside the liquid crystal display device 2.

The display portion 100 is formed with a plurality of (m pieces) source lines SL1 to SLm as data signal lines, a plurality of (n pieces) gate lines GL1 to GLn as scanning signal lines, and a plurality of (m×n pieces) pixel formation portions 110 that are provided corresponding to intersections of the m pieces of source lines SL1 to SLm and n pieces of gate lines GL1 to GLn. Hereinafter, when the m pieces of source lines SL1 to SLm are not distinguished, these are simply referred to as the "source lines SL", and when the n pieces of gate lines GL1 to GLn are not distinguished, these are simply referred to as "gate lines GL". The m×n pieces of pixel formation portions 110 are formed in a matrix form along the source lines SL and the gate lines GL. Each of the pixel formation portions 110 is made up of: a TFT 111 as a switching element having a gate terminal as a control terminal connected to the gate line GL passing through the corresponding intersection, and having a source terminal connected to the source line SL passing through the intersection; a pixel electrode 112 connected to a drain terminal of the TFT 111; a common electrode 113 commonly provided in the m×n pieces of pixel formation portions 110; and a liquid crystal layer placed between the pixel electrode 112 and the common electrode 113 and commonly provided in the plurality of pixel formation portions 110. A liquid crystal capacitance, formed of the pixel electrode 112 and the common electrode 113, constitutes a pixel capacitance Cp. It is to be noted that, since an auxiliary capacitance is typically provided in parallel to the liquid crystal capacitance so as to reliably hold a voltage in the pixel capacitance Cp, the pixel capacitance Cp is practically made up of the liquid crystal capacitance and the auxiliary capacitance.

In the present embodiment, for example, a TFT using an oxide semiconductor layer for a channel layer (hereinafter referred to as the "oxide TFT") is used as the TFT 111. The oxide semiconductor layer contains an In—Ga—Zn—O semiconductor, for example. Herein, the In—Ga—Zn—O semiconductor is a ternary oxide of In (indium), Ga (gallium) and Zn (zinc), and proportions (composition ratios) of In, Ga and Zn are not particularly limited, and for example, In:Ga:Zn=2:2:1, In:Ga:Zn=1:1:1, In:Ga:Zn=1:1:2, or the like. In the present embodiment, an In—Ga—Zn—O semiconductor film containing In, Ga and Zn at a ratio of 1:1:1 is used.

A TFT including the In—Ga—Zn—O semiconductor layer has high mobility (more than 20 times as large compared with that of a TFT using amorphous silicon for a channel layer, namely a-Si TFT) and a low leak current (less than a hundredth as small compared with that of a-SiTFT), and is thus preferably used as a drive TFT and a pixel TFT. The use of the TFT including the In—Ga—Zn—O semiconductor layer enables significant reduction in power consumption of the display device.

The In—Ga—Zn—O semiconductor may be amorphous, or may contain a crystalline part and have crystallinity. As the crystalline In—Ga—Zn—O semiconductor, a crystalline In—Ga—Zn—O semiconductor with a c-axis oriented substantially vertically to the layer surface is preferred. A crystal structure of such an In—Ga—Zn—O semiconductor is disclosed in Japanese Patent Application Laid-Open No. 2012-134475, for example. The contents of Japanese Patent Application Laid-Open No. 2012-134475 are incorporated by reference herein in its entirety.

The oxide semiconductor layer may contain another oxide semiconductor in place of the In—Ga—Zn—O semiconductor. For example, the oxide semiconductor layer may contain a Zn—O semiconductor (ZnO), an In—Zn—O semiconductor (IZO (registered trademark)), a Zn—Ti—O semiconductor (ZTO), a Cd—Ge—O semiconductor, a Cd—Pb—O semiconductor, CdO (cadmium oxide), an Mg—Zn—O semiconductor, an In—Sn—Zn—O semiconductor (e.g., $In_2O_3$—$SnO_2$—ZnO), an In—Ga—Sn—O semiconductor, or the like. It is to be noted that the use of the oxide TFT as the TFT 111 is just an example, and in place of this, a silicon TFT or the like may be used.

The display control circuit (hereinafter also referred to as the "TCON") 200 receives data DAT for each one screen from the host 80 via the FPC 20, and in accordance with this, the display control circuit 200 generates and outputs a signal line control signal SCT, a scanning line control signal GCT, and a common potential Vcom. The signal line control signal SCT is provided to the source driver 310. The scanning line control signal GCT is provided to the gate driver 320. The common potential Vcom is provided to the common electrode 113. In the present liquid crystal display device, the data DAT is transmitted and received between the display control circuit 200 and the external host 80 via an interface conforming to DSI (Display Serial Interface) standard proposed by MIPI (Mobile Industry Processor Interface) Alliance. This interface conforming to DSI standard enables transmission of data at high speed. As for transmission and reception of data between the display control circuit 200 and the host in the liquid crystal display device, the same also applies to each of embodiments described later. However, the interface used for transmission and reception of data and signals between the display device and the host in the present invention is not limited to the interface conforming to DSI standard, and in place of this or together with this, another suitable interface, such as an interface conforming to I2C (Inter Integrated Circuit) standard or SPI (Serial Peripheral Interface) standard, may be used.

The source driver 310 generates and outputs data signals to be provided to the source lines SL in accordance with the signal line control signal SCT. The signal line control signal SCT includes, for example, a digital video signal representing an image to be displayed, a source start pulse signal, a source clock signal, and a latch strobe signal. The source driver 310 causes a shift register, a sampling latch circuit, and the like, which are located inside and not shown, to operate in accordance with the source start pulse signal, the source clock signal, and the latch strobe signal, and converts digital signals obtained based on the digital video signal to analog signals in a DA conversion circuit, not shown, thereby generating data signals as driving image signals.

The gate driver 320 repeats application of active scanning signals to the gate lines GL in a predetermined cycle in accordance with the scanning line control signal GCT. The scanning line control signal GCT includes a gate clock signal and a gate start pulse signal, for example. The gate driver 320 causes a shift register and the like, located inside and not shown, to operate in accordance with the gate clock signal and the gate start pulse signal, thereby generating scanning signals.

The backlight unit 30 is provided on the rear surface side of the liquid crystal display panel 10 and irradiates the rear surface of the liquid crystal display panel 10 with backlight. The backlight unit 30 typically includes a plurality of LEDs (Light Emitting Diodes). The backlight unit 30 may be controlled by the display control circuit 200 or may be controlled by using another method. It is to be noted that, when the liquid crystal display panel 10 is of a reflection type, the backlight unit 30 does not need to be provided.

As described above, the data signals are applied to the source lines SL, and the scanning signals are applied to the gate lines GL, and the backlight unit 30 is driven, whereby an image in accordance with data transmitted from the host 80 is displayed on the display portion 100 of the liquid crystal display panel 10. Although voltage application to the common electrode 113 or drive of the common electrode 113 is required for displaying an image on the liquid crystal display panel 10 as previously described, since a configuration and an operation for this are not directly related to characteristics of the present invention, descriptions of these are omitted below.

<0.2 Driver IC and its Use Mode>

As previously described, in recent years, a one-chip driver usable in a liquid crystal display device for mobile electronic equipment has been provided. In the case of the liquid crystal display device shown in FIG. 1, the use of the one-chip driver enables one IC to realize a circuit 300 including the source driver 310, the gate driver 320, and the display control circuit 200. For the liquid crystal display device shown in FIG. 1, for example, a driver IC 300 having a configuration shown in FIG. 2 can be used as the one-chip driver.

Figure 2:
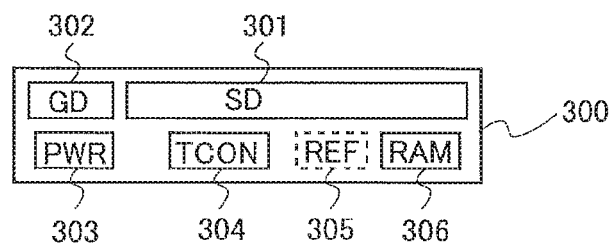
FIG. 2 is a block diagram showing a configuration example of a one-chip driver.

The driver IC 300 shown in FIG. 2 includes a RAM (Random Access Memory) 306 as a rewritable memory for temporarily storing display image data received from the host 80, and a PWR 303 as a power supply circuit in addition to an SD 301, a GD 302, and a ICON 304 respectively corresponding to the source driver 310, the gate driver 320, and the display control circuit 200 in the liquid crystal display device shown in FIG. 1, and functions as a drive control circuit in the liquid crystal display device. The PWR 303 generates a voltage required for operations of the SD 301, the GD 302, the ICON 304, the RAM 306 and the like, based on a power voltage provided from the outside. This driver IC 300 may further include a REF 305 as a refresh detection portion described later.

As previously described, with increase in resolution of the display device for mobile electronic equipment, it may not be possible for only the source driver (SD301) included in the one driver IC 300 to drive all source lines in the liquid crystal display device, and in this case, a plurality of driver ICs are used.

Figure 3:
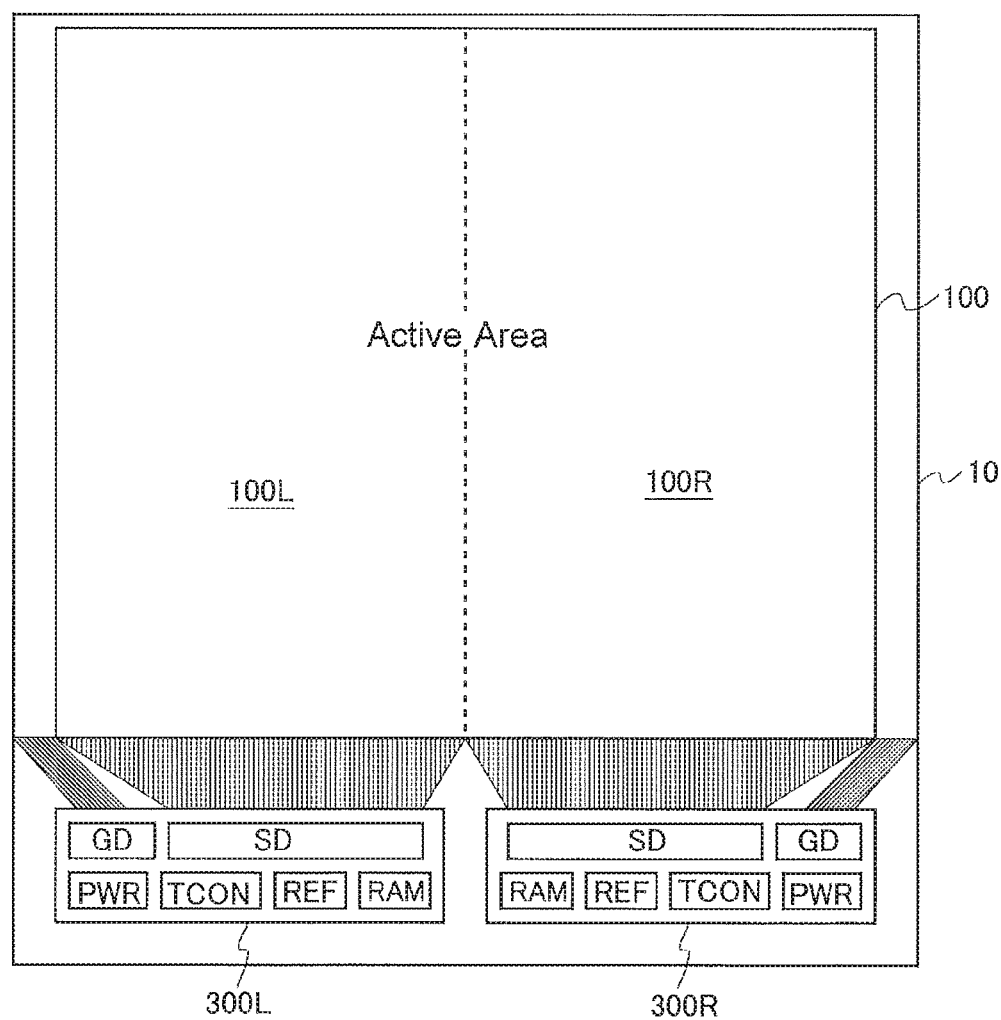
FIG. 3 is a block diagram showing a configuration example of a liquid crystal display device using two driver ICs.

FIG. 3 is a block diagram showing a configuration example of the liquid crystal display device in the case of using two driver ICs. However, in FIG. 3, a backlight unit, a common electrode line, and constitutional elements concerning the drive thereof, which are not directly related to the present invention, are omitted since they are based on well-known techniques, and constitutional elements concerning the display portion 100 in the liquid crystal display panel 10 and the driver ICs are mainly shown (this also applies to FIGS. 4 to 7, 14, 20, and 26).

In the liquid crystal display device shown in FIG. 3, on the liquid crystal display panel 10, the display portion 100 is formed, and driver ICs 300L, 300R are mounted as two drive control circuits constituting the drive control portion. Each of these two driver ICs 300L, 300R includes an SD (source driver), a GD (gate driver), a refresh detection portion (REF), a ICON (timing controller), a RAM and a PWR (power supply circuit). Source lines in a left active area 100L in the left half of an active area (also denoted by reference numeral "100") which is an area for formation of the display portion 100 in the liquid crystal display panel 10, are connected to the SD in the driver IC 300L (hereinafter referred to as "left driver IC 300L"), and source lines in a right active area 100R in the right half of the active area 100 are connected to the SD in the driver IC 300R (hereinafter referred to as "right driver IC 300R)

Herein, each source line (not shown) in the active area 100 is arranged so as to extend in a vertical direction in the figure (this also applies to configurations of FIGS. 4 to 6 and each of the embodiments described later), and the active area 100 as the display area is divided into the left active area 100L as a sub display area and the right active area 100R as a sub display area by a phantom division line along the source line (this also applies to configurations of FIGS. 4 to 6 and each of the embodiments described later). The source lines in the left active area 100L are driven by the SD in the left driver IC 300L, and the source lines in the right active area 100R are driven by the SD in the right driver IC 300R.

Further, each gate line (not shown) in the active area 100 is assumed to be arranged so as to extend in a lateral direction in the figure (this also applies to a configuration example of FIG. 4 described later). The left end of each gate line is connected to the GD in the left driver IC 300L, the right end of each gate line is connected to the GD in the right driver IC 300R, and each gate line is driven by both the left and right driver ICs 300L, 300R. However, the configuration of connection between each gate line and each of the left and right driver ICs 300L, 300R is not limited thereto, and each gate line may be configured to be connected to only the GD in either the left driver IC 300L or the right driver IC 300R. For example, an odd-numbered gate line may be connected to the GD in the left driver IC 300L, and an even-numbered gate line may be connected to the GD in the right driver IC 300R. Further, all the gate lines may be configured to be connected to only either the left driver IC 300L or the right driver IC 300R.

Figure 4:
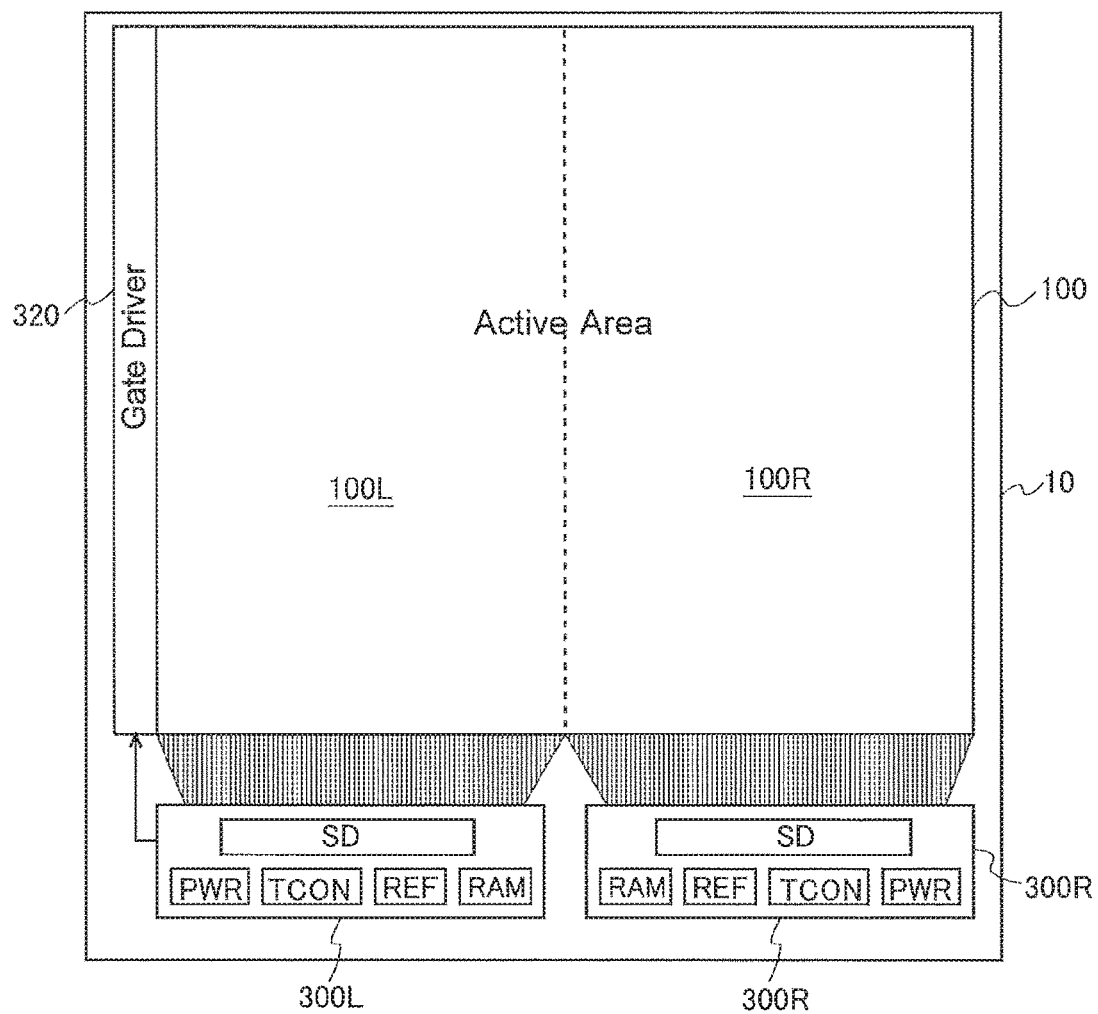
FIG. 4 is a block diagram showing another configuration example of the liquid crystal display device using two driver ICs.
Figure 5:
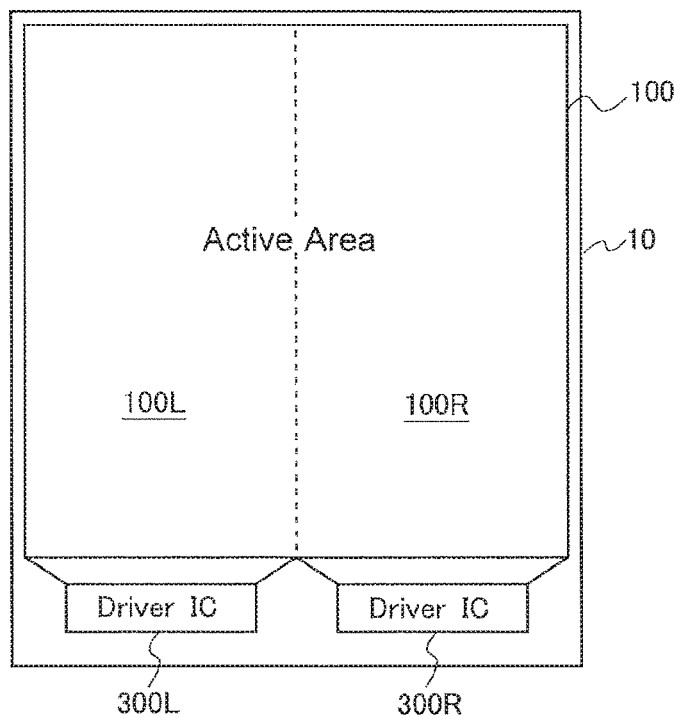
FIG. 5 is a diagram showing a schematic configuration of the liquid crystal display device using two driver ICs.

FIG. 4 is a block diagram showing another configuration example of the liquid crystal display device in the case of using the two driver ICs. In the liquid crystal display device shown in FIG. 4, on the liquid crystal display panel 10, the display portion 100 is formed in the liquid crystal display panel 10, and the driver ICs 300L, 300R are mounted as two drive control circuits, as in the configuration example of FIG. 3, but in addition to this, the gate driver 320 as a scanning signal line drive circuit is integrally formed with the active area 100, which is a different respect from the configuration example of FIG. 3. That is, the liquid crystal display panel 10 in the configuration example of FIG. 4 is a so-called gate driver monolithic panel. Further, in the configuration example of FIG. 4, neither the left driver IC 300L nor the right driver IC 300R includes the GD (gate driver). It is to be noted that in the configuration example of FIG. 4, the two driver ICs 300L, 300R and the gate driver 320 constitute the drive control portion.

In the configuration example of FIG. 4, the gate driver 320 integrally formed with the active area 100 is connected to the ICON in the left driver IC 300L. Each gate line in the active area 100 is driven by the gate driver 320 under control by the ICON. Configurations of the other parts in the configuration example of FIG. 4 are similar to those in the configuration example of FIG. 3, and hence detailed descriptions thereof are omitted.

In each of the embodiments of the present invention described below, the two driver ICs 300L, 300R are used similarly to the above, but internal configurations thereof and the configurations of connection thereof with other elements may be implemented in either the configuration example of FIG. 3 or the configuration example of FIG. 4. Hereinafter, a block diagram shown in FIG. 5 represents a schematic configuration of the liquid crystal display device according to each of the embodiments, without distinguishing between the above two configurations. It is to be noted that in the following description, the display portion (active area) 100 of the liquid crystal panel is assumed to be driven by the two driver ICs in the liquid crystal display device, but the present invention is not limited thereto, and the display portion (active area) 100 may be configured to be driven by three or more driver ICs. For example, as shown in FIG. 6, in the case of a configuration where the display portion (active area) 100 is driven by three driver ICs 300L, 300C, 300R, the active area 100 is divided into three areas of a left active area 100L, a center active area 100C, and a right active area 100R by a phantom division line along the source line, and the source lines in the left, center and right active areas 100L, 100C, 100R are respectively connected to (the SDs in) the left, center and right driver ICs 300L, 300C, 300R, and are respectively driven by (the SDs in) the left, center and right driver ICs 300L, 300C, 300R.

1. First Embodiment

Figure 7:
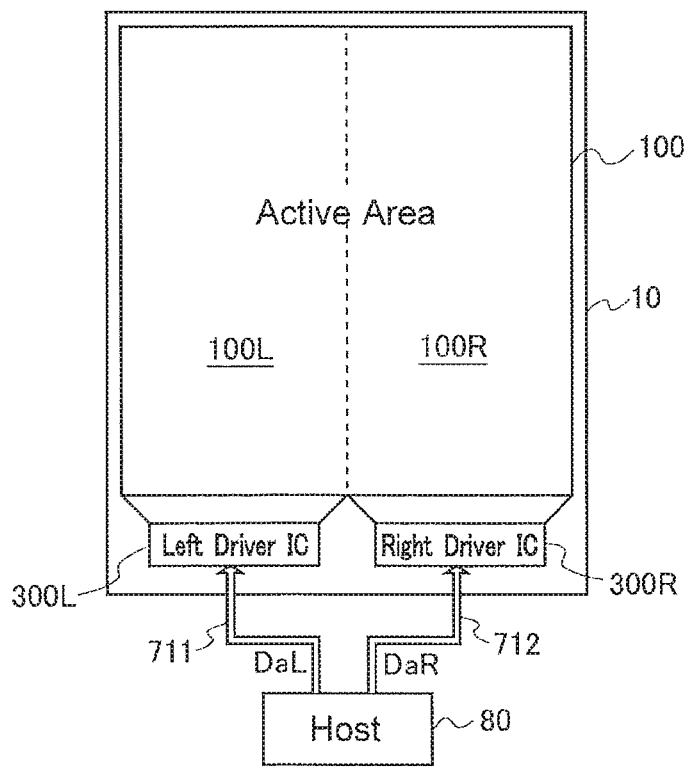
FIG. 7 is a diagram showing a whole configuration of a liquid crystal display device according to a first embodiment of the present invention.

FIG. 7 is a diagram showing a whole configuration of a liquid crystal display device according to a first embodiment of the present invention. This liquid crystal display device includes the active matrix-type liquid crystal display panel 10, and in this liquid crystal display panel 100, the display portion (active area) 100 is formed, and two driver ICs are mounted as the left driver IC 300L and the right driver IC 300R. The active area 100 has been divided into the left active area 100L and the right active area 100R by the phantom division line along the source line, and the source lines in the left active area 100L are driven by the left driver IC 300L, while the source lines in the right active area 100R are driven by the right driver IC 300R.

(The TCON in) each of both the left and right driver ICs 300L, 300R is connected with the host 80 by the previously described appropriate interface, such as the interface conforming to MIPI-DSI standard. Data (hereinafter referred to as "left-half data") DaL for displaying an image in the left active area 100L is transferred to the left driver IC 300L in accordance with the interface, thereby realizing a data path (hereinafter referred to as a "left-sub data path") 711 for providing the left-half data from the host 80 to the left driver IC 300L. Further, data (hereinafter referred to as "right-half data") DaR for displaying an image in the right active area 100R is transferred to the right driver IC 300R in accordance with the interface, thereby realizing a data path (hereinafter referred to as a "right sub data path") 712 for providing the right-half data DaR from the host 80 to the right driver IC 300R. Herein, in addition to image data (hereinafter referred to as "left-half image data") representing an image (hereinafter referred to as a "left-half image") to be displayed in the left active area 100L, the left-half data DaL includes timing information (information corresponding to a synchronization signal, a data enable signal, a clock signal, etc.) required for displaying the left-half image, and in addition to image data (hereinafter referred to as "right-half image data") representing an image (hereinafter referred to as a "right-half image") to be displayed in the right active area 100R, the right-half data DaR includes timing information required for displaying the right-half image (information corresponding to a synchronization signal, a data enable signal, a clock signal, etc.).

Figure 8:
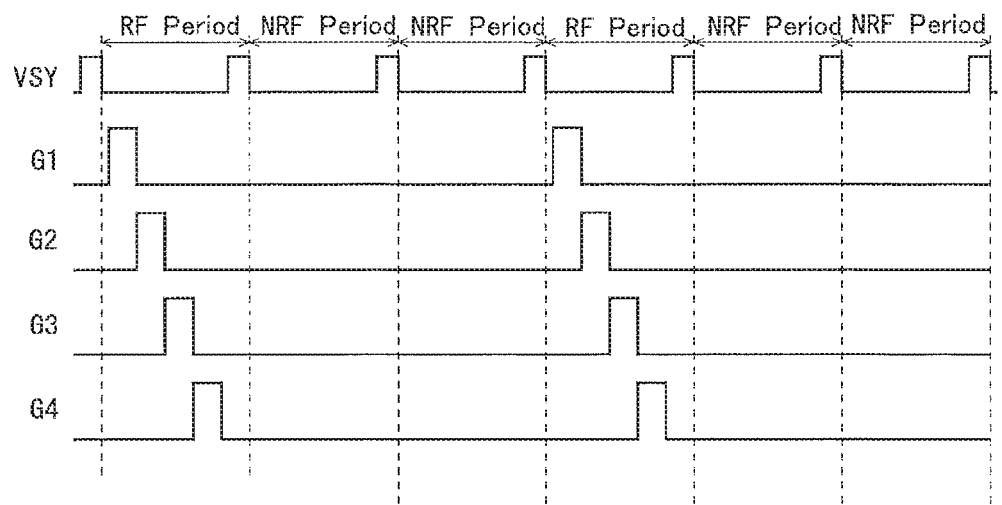
FIG. 8 is a timing chart for describing an operation of the liquid crystal display device according to the first embodiment.

FIG. 8 is a timing chart for explaining an operation of the liquid crystal display device according to the present embodiment. For convenience of description, FIG. 8 is drawn with the number of gate lines, as the scanning signal lines, set to n=4. In the present embodiment, when an image is displayed on the display portion 100, a pixel voltage held as pixel data in the pixel capacitance Cp of each of the pixel formation portions 110 in the display portion 100 is rewritten in a predetermined cycle (see FIG. 1). That is, the display image on the display portion 100 is refreshed in a predetermined cycle. In the present embodiment, this refresh cycle has three frame periods which are one frame period as a refresh period and subsequent two frame periods as non-refresh periods. Herein, "one frame period" is a period for refresh (writing or rewriting of data voltages) for one screen, and a length of the "one frame period" is a length (16.67 ms) of one frame period in a typical display device with a refresh rate of 60 Hz, but the present invention is not limited thereto. It is to be noted that the refresh cycle in the present embodiment may have two or more frame periods, and a specific number thereof is decided in consideration of frequency of a change in image to be displayed on the display portion 100, or the like (the same also applies to other embodiments described later.). For example, one frame period as a refresh period (hereinafter also referred to as an "RF period") and 59 frame periods as non-refresh periods (hereinafter also referred to as "NRF periods") subsequent to the one frame period, that is, 60 frame periods can be taken as the refresh cycle, and in this case, a refresh rate is 1 Hz. Further, a length of the refresh period may be not smaller than a length of the two frame periods (this also applies to the other embodiments described later).

As shown in FIG. 8, the ICON in each of the left and right driver ICs 300L, 300R in the present embodiment generates a vertical synchronization signal VSY that is on an H level only during a predetermined period in each one frame period (one vertical period), and provides this vertical synchronization signal VSY as one of scanning-side control signals GCT to the GD (gate driver) (see FIGS. 2 to 4).

During an effective vertical scanning period (i.e., a period which excludes a vertical blanking period including a period with the vertical synchronization signal being on the H-level) in each of frame periods corresponding to the refresh periods, scanning signals G1 to G4 that are respectively applied to the gate lines GL1 to GL4 of the display portion 100 sequentially become active (H-level). Further, during the effective vertical scanning period in the refresh period, data signals S1 to Sm representing the image to be displayed are respectively applied to the source lines SL1 to SLm of the display portion 100. Thereby, a pixel voltage representing each pixel constituting the image to be displayed is written into (the pixel capacitance Cp of) the pixel formation portion 110 as pixel data.

During the frame period corresponding to the non-refresh period, all the scanning signals G1 to G4 are non-active (L-level), and the gate lines GL1 to GL4 in the display portion 100 are all in a non-selected state. For this reason, during the non-refresh period, the pixel data written into each of the pixel formation portions 110 of the display portion 100 in the refresh period immediately before the non-refresh period is held as it is, whereby the display of the image on the display portion 100 at the end of the refresh period immediately before the non-refreshing period continues. During such a non-refresh period, the drive of the display portion 100 performed by the SD (source driver) and the GD (gate driver) in each of the left and right driver ICs 300L, 300R is paused, and power consumption in each of the left and right driver ICs 300L, 300R is significantly reduced.

As in the present embodiment, in a case where image update is forcibly performed during the non-refresh period in the display device which is configured such that the source lines in the display portion (active area) 100 are shared and driven by a plurality of driver ICs (the left driver IC 300L and right driver IC 300R) and which performs pause drive as described above, or in some other case, the left driver IC 300L refreshes the display image in the left active area 100L, and the right driver IC 300R refreshes the display image in the right active area 100R. More specifically, the left driver IC 300L drives the source lines in the left active area 100L based on data received from the host 80 for the image update to write voltages of data signals representing the left half (left-half image) of a new display image into the respective pixel formation portions in the left active area 100L, and the right driver IC 300R drives the source lines in the right active area 100R based on data received from the host 80 for the image update to write voltages of data signals representing the right half (right-half image) of a new display image into the respective pixel formation portions in the right active area 100R. In addition, although either or both the left and right driver ICs 300L, 300R drive each gate line in the active area 100 so as to perform such refresh (see FIGS. 3 and 4), the configuration and operation concerning the drive of the gate line are not directly related to the characteristics of the present invention and are based on well-known techniques, and hence detailed descriptions thereof are omitted below.

As described above, when each of the plurality of driver ICs (the left driver IC 300L and the right driver IC 300R in the present embodiment) refreshes a shared area of the active area 100 (either the left active area 100L or the right active area 100R in the present embodiment), abnormality such as display misalignment may occur in the display image on the display portion (active area).

Therefore, the present embodiment has a configuration as described below so as to synchronize refresh performed by the left driver IC 300L and refresh performed by the right driver IC 300R.

<1.1 First Configuration Example for Synchronizing Refresh>

Figure 9:
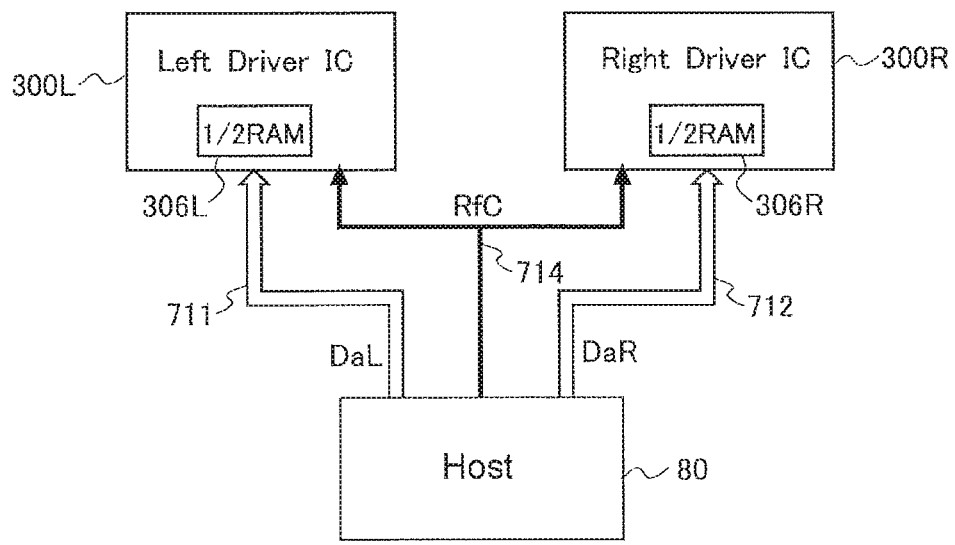
FIG. 9 is a block diagram showing a first configuration example for synchronizing refresh in the first embodiment.

FIG. 9 is a block diagram showing a first configuration example for synchronizing refresh in the present embodiment. In the present configuration example, each of both the left and right driver ICs 300L, 300R includes a RAM as a rewritable memory which has storage capacity for storing data (the left-half data DaL in the left driver IC 300L or the right-half data DaR in the right driver IC 300R) for display of a half-screen image in addition to the SD (source driver) and the ICON (timing controller). Hereinafter, when it is explicitly indicated that a RAM for temporarily storing display image data received from the host has storage capacity for storing data for display of a half-screen image as described above, the RAM is referred to as the "1/2 RAM". In contrast to this, when it is explicitly indicated that the RAM has storage capacity for storing data for display of a whole image to be displayed on the display portion 100, namely an image for one screen, the RAM is referred to as the "2/2 RAM". It is to be noted that each of both the left and right driver ICs 300L, 300R does not include the REF (refresh detection portion).

In the present configuration example, there is formed a path (hereinafter referred to as "control signal path") 714 for output of the refresh control signal RfC instructing starting of the refresh operation for the above image update from the host 80, and for transmission of the refresh control signal RfC to both the left and right driver ICs 300L, 300R. The control signal path 714 may be realized by providing a dedicated signal line between the host 80 and the left and right driver ICs 300L, 300R, or in place of this, it may be realized by transferring the refresh control signal RfC from the host 80 to the left and right driver ICs 300L, 300R in accordance with an interface (e.g., the interface conforming to I2C standard or SPI standard) that is used for connecting the host 80 to the left and right driver ICs 300L, 300R.

When the image update is to be performed, the left-half data DaL is transferred from the host 80 to the left driver IC 300L, and the right-half data DaR is transferred from the host 80 to the right driver IC 300R, from among data for displaying a new image by the image update (hereinafter referred to as "refresh data"), and the refresh control signal RfC instructing starting of the refresh operation on the display image in the active area 100 based on the refresh data is transferred from the host 80 to (the ICON of) the left and right driver ICs 300L, 300R.

In the left driver IC 300L, when receiving the left-half data DaL, the ICON stores it as drive data in the 1/2 RAM 306L. When receiving the refresh control signal RfC in addition to the left-half data DaL, the ICON generates an image signal and a control signal for causing the SD to operate based on the drive data, namely the left-half data DaL stored in the 1/2 RAM 306L, and outputs these signals to the SD at timing based on the refresh control signal RfC. In addition, when the GD is included in the left driver IC 300L and the gate lines are to be driven by the GD, upon receipt of the refresh control signal RfC, the ICON generates a control signal for causing the GD to operate based on the left-half data DaL stored in the 1/2 RAM 306L, and outputs the generated control signal to the GD at the timing based on the refresh control signal RfC. In this case, the GD drives the gate lines in the active area 100 based on the control signal.

In the right driver IC 300R, when receiving the right-half data DaR, the ICON stores it as drive data in the 1/2 RAM 306R. When receiving the refresh control signal RfC in addition to the right-half data DaR, the ICON generates an image signal and a control signal for causing the SD to operate based on the drive data, namely the right-half data DaR stored in the 1/2 RAM 306R, and outputs the signals to the SD at timing based on the refresh control signal RfC. In addition, when the GD is included in the right driver IC 300R and the gate lines are to be driven by the GD, upon receipt of the refresh control signal RfC, the ICON generates a control signal for causing the GD to operate based on the right-half data DaR stored in the 1/2 RAM 306R, and outputs the control signal to the GD at the timing based on the refresh control signal RfC. In this case, the GD drives the gate lines in the active area 100 based on the control signal.

As thus described, the left driver IC 300L drives the source lines in the left active area 100L to refresh the display image in the left active area 100L, and the right driver IC 300R drives the source lines in the right active area 100R to refresh the display image in the right active area 100R. It is to be noted that the above refresh is performed on the assumption that the gate lines in the active area 100 are driven as described above, but for convenience of description, a description concerning the drive of the gate lines is omitted (this also applies to the other configuration examples and the other embodiments described later).

As seen from the above, since each of both the left and right driver ICs 300L, 300R drives the source lines based on the refresh control signal RfC of the host 80, the refresh of the display image in the left active area 100L performed by the left driver IC 300L and the refresh of the display image in the right active area 100R performed by the right driver IC 300R are synchronized. For this reason, even when the display portion 100 is driven by the two driver ICs 300L, 300R as in the present embodiment, abnormality such as display misalignment does not occur. Hence in the liquid crystal display device that performs pause drive, the display portion 100 is driven by the two driver ICs 300L, 300R to enable favorable display of a high-resolution image.

Although the present configuration example is required to be a configuration for transmitting the refresh control signal RfC from the host 80 to the left and right driver ICs 300L, 300R, it has an advantage, as compared with the other configuration examples described later, in that the refresh operations can be reliably synchronized, and that transmission and reception of a signal for synchronization between the left and right driver ICs 300L, 300R are unnecessary.

<1.2 Second Configuration Example for Synchronizing Refresh>

Figure 10:
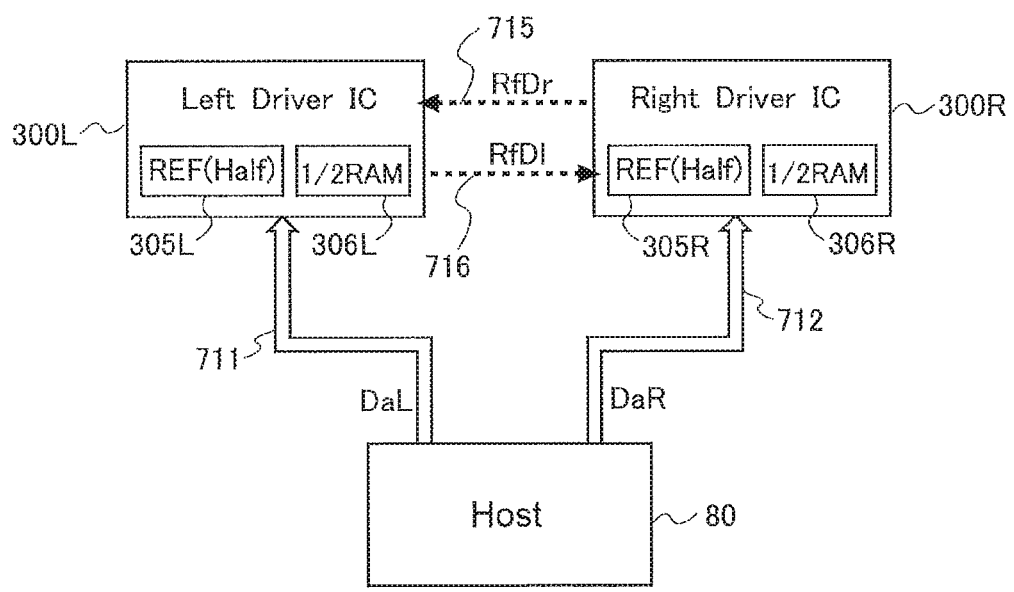
FIG. 10 is a block diagram showing a second configuration example for synchronizing refresh in the first embodiment.

FIG. 10 is a block diagram showing a second configuration example for synchronizing refresh in the present embodiment. In the present configuration example, the refresh control signal RfC instructing starting of the refresh operation for the image update is not outputted from the host 80.

Similarly to the above first configuration example, when the image update is to be performed, from among refresh data for displaying a new image by the image update, the left-half data DaL is transferred from the host 80 to the left driver IC 300L, and the right-half data DaR is transferred from the host 80 to the right driver IC 300R.

In the present configuration example, each of both the left and right driver ICs 300L, 300R includes the REF (refresh detection portion) in addition to the SD (source driver), the ICON (timing controller), and the 1/2 RAM. The REF detects refresh start timing by determining whether or not the display image is to be updated based on image data being the half of image data representing a display image for one screen, or the like, to generate a refresh detection signal RfD indicating the detected start timing (hereinafter, a refresh detection portion that generates a refresh detection signal indicating the refresh start timing based on image data being the half of image data for one screen as described above is referred to as "REF (Half)"). It is to be noted that the technique of detecting the refresh start timing in the REF is not particularly limited, and for example, the following can be used as the technique of detecting the refresh start timing: a technique based on comparison per pixel between (image data being the half of) data of the display image at the moment and (image data being the half of) data of the display image newly received from the host; a technique based on comparison between sums of gradation values of the two images; a technique based on comparison between histograms of the two images; a technique based on comparison between checksum data of the two images; a technique based on specific control information added to data of each image; a technique of generating refresh timing in accordance with a frame counter inside the ICON; a technique based on image processing by use of a CABC (Content Adaptive Brightness Control) technique; or some other technique. This also applies to the other embodiments.

More specifically, as shown in FIG. 10, the left driver IC 300L has a REF (Half) 305L built therein which generates a refresh detection signal RfDl by determining whether or not the display image in the left active area 100L is to be changed based on the left-half data DaL received from the host 80, or the like. Further, the right driver IC 300R has a REF (Half) 305R built therein which generates a refresh detection signal RfDr by determining whether or not the display image in the right active area 100R is to be changed based on the right-half data DaR received from the host 80, or the like.

Further, in the present configuration example, there is formed a signal path (hereinafter referred to as a "first signal path") 715 for transmitting the refresh detection signal RfDr generated in the REF (Half) 305R of the right driver IC 300R to the left driver IC 300L, and there is formed a signal path (hereinafter referred to as a "second signal path") 716 for transmitting the refresh detection signal RfDl generated in the REF (Half) 305L of the left driver IC 300L to the right driver IC 300R. The first and second signal paths 715, 716 can be realized by providing a dedicated signal line between the left driver IC 300L and the right driver IC 300R. Further, in place of this, the first and second signal paths 715, 716 may be realized by connecting the left driver IC 300L with the right driver IC 300R through the interface conforming to I2C standard or SPI standard (bidirectional serial bus), for example, and in accordance with the interface, transferring the refresh detection signal RfDr from the right driver IC 300R to the left driver IC 300L, while transferring the refresh detection signal RfDl from the left driver IC 300L to the right driver IC 300R.

In the present configuration example, the ICON of the left driver IC 300L stores the left-half data DaL as drive data in 1/2 RAM 306L when receiving the left-half data DaL from the host 80, and the ICON of the right driver IC 300R stores the right-half data DaR as drive data in the 1/2 RAM 306R when receiving the right-half data DaR from the host 80.

Further, in the present configuration example, when the REF (Half) 305L of the left driver IC 300L detects the start timing for the refresh operation for the image update based on the left-half data DaL from the host 80, the left driver IC 300L transmits the refresh detection signal RfDl indicating the start timing for the refresh operation to the right driver IC 300R, and starts the refresh operation (drive of the source lines in the left active area 100L based on the left-half data DaL stored in the 1/2 RAM 306L) based on the start timing. When the REF (Half) 305R of the right driver IC 300R detects the start timing for the refresh operation for the image update based on the right-half data DaR from the host 80, the right driver IC 300R transmits the refresh detection signal RfDr indicating the start timing for the refresh operation to the left driver IC 300L, and starts the refresh operation (drive of the source lines in the right active area 100R based on the right-half data DaR stored in the 1/2 RAM 306R) based on the start timing. Moreover, each of both the left and right driver ICs 300L, 300R starts the refresh operation upon receipt of the refresh detection signal RfDl or RfDr from the other. However, in a case where the right driver IC 300R or the left driver IC 300L upon receipt of the fresh detection signal RfDl or RfDr has detected the refresh start timing in the REF (Half) on the inside thereof and has already started the refresh operation, the right driver IC 300R or the left driver IC 300L continues the already started refresh operation and ignores the refresh detection signal RfDl or RfDr received from the other.

According to the present configuration example thus described, in a case where the refresh start timing is detected only in the refresh detection portion (REF (Half)) in one of both the left and right driver ICs 300L, 300R, for example, even when the display image in the left active area 100L is the same as an image indicated by the left-half data DaL transferred from the host and the display image in the right active area 100R is different from an image indicated by the right-half data DaR transferred from the host, the refresh of the display image in the left active area 100L performed by the left driver IC 300L and the refresh of the display image in the right active area 100R performed by the right driver IC 300R are performed in synchronization with each other. For this reason, even when the display portion 100 is driven by the two driver ICs 300L, 300R as in the present embodiment, abnormality such as display misalignment does not occur. Hence in the liquid crystal display device that performs pause drive, the display portion 100 is driven by the two driver ICs 300L, 300R to enable favorable display of a high-resolution image.

<1.3 Third Configuration Example for Synchronizing Refresh>

Figure 11:
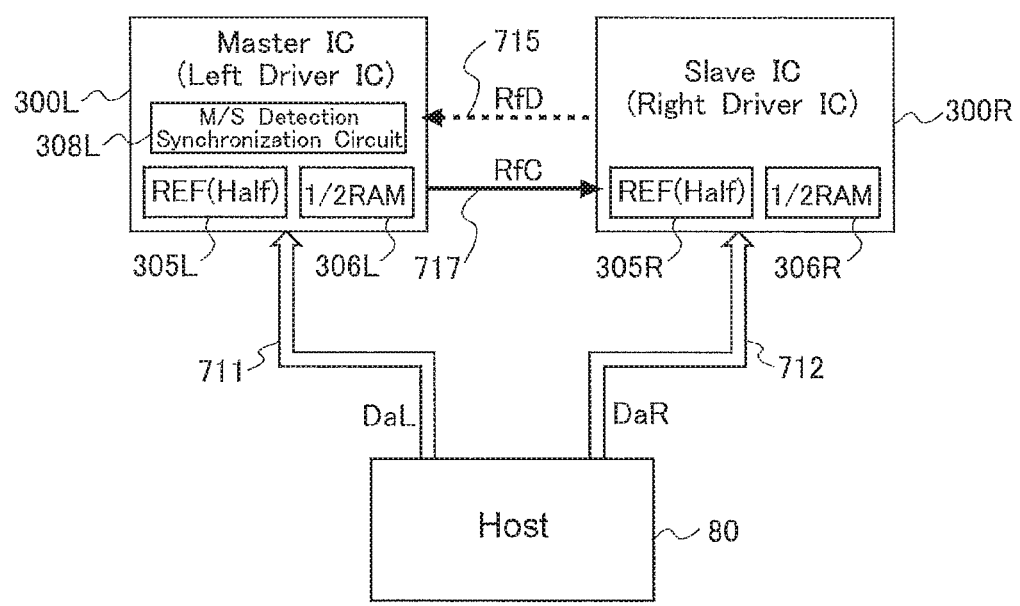
FIG. 11 is a block diagram showing a third configuration example for synchronizing refresh in the first embodiment.

FIG. 11 is a block diagram showing a third configuration example for synchronizing refresh in the present embodiment. The present configuration example is based on a system where one of a plurality of driver ICs used for drive of the active area 100 is taken as a master IC while the other is taken as a slave IC, and the master IC controls the start timing for refresh performed by the slave IC. As shown in FIG. 11, in the present configuration example, the left driver IC 300L is taken as the master IC, and the right driver IC 300R is taken as the slave IC.

Similarly to the above first configuration example, when the image update is to be performed, from among refresh data for displaying a new image by the image update, the left-half data DaL is transferred from the host 80 to the left driver IC 300L, and the right-half data DaR is transferred from the host 80 to the right driver IC 300R.

Also in the present configuration example, as in the first configuration example, the left and right driver ICs 300L, 300R respectively include the REF (Half) 305L and the REF (Half) 305R.

Further, in the present configuration example, there is formed a signal path (first signal path) 715 for transmitting the refresh detection signal RfD generated in the REF (Half) 305R of the slave IC (right driver IC) 300R to the left driver IC 300L, and there is formed a signal path (hereinafter referred to as a "third signal path") 717 for transmitting the refresh control signal RfC instructing starting of the refresh operation from the master IC (left driver IC) 300L to the slave IC 300R. The first and third signal paths 715, 717 are implemented in a similar manner as mentioned in the second configuration example.

Moreover, in the present configuration example, the master IC 300L includes an M/S detection synchronization circuit 308L. Into the M/S detection synchronization circuit 308L, the refresh control signal RfD is inputted when generated in the master IC 300L, and the refresh detection signal RfD is inputted via the first signal path 715 when generated in the slave IC 300R. Upon input of either of the refresh control signal RfC and the refresh detection signal RfD, the M/S detection synchronization circuit 308L causes the SD to start refresh of a display image in the left active area 100L. Herein, the timing to cause the SD to start refresh of the display image in the left active area 100L may be adjusted between the case of input of the refresh control signal RfC and the case of input of the refresh detection signal RfD such that the refresh operation on the left active area 100L is in accurate synchronization with the refresh operation on the right active area 100R.

Configurations other than the above are similar to those in the second configuration example, and the same or corresponding part is provided with the same reference numeral, and a detailed description thereof is omitted.

Also in the present configuration example, when the image update is to be performed, from among refresh data for displaying a new image by the image update, the left-half data DaL is transferred from the host 80 to the master IC (left driver IC 300L), and the right-half data DaR is transferred from the host 80 to the slave IC (right driver IC) 300R. When receiving the left-half data DaL from the host 80, the ICON of the master IC 300L stores it as drive data in the 1/2 RAM 306L. When receiving the right-half data DaR from the host 80, the ICON of the slave IC 300R stores it as drive data in the 1/2 RAM 306R. Further, in the present configuration example, the REF (Half) 305L of the master IC 300L detects the start timing for the refresh operation for the image update based on the left-half data DaL from the host 80, and the REF (Half) 305R of the slave IC 300R detects the start timing for the refresh operation for the image update based on the right-half data DaR from the host 80.

Figure 12:
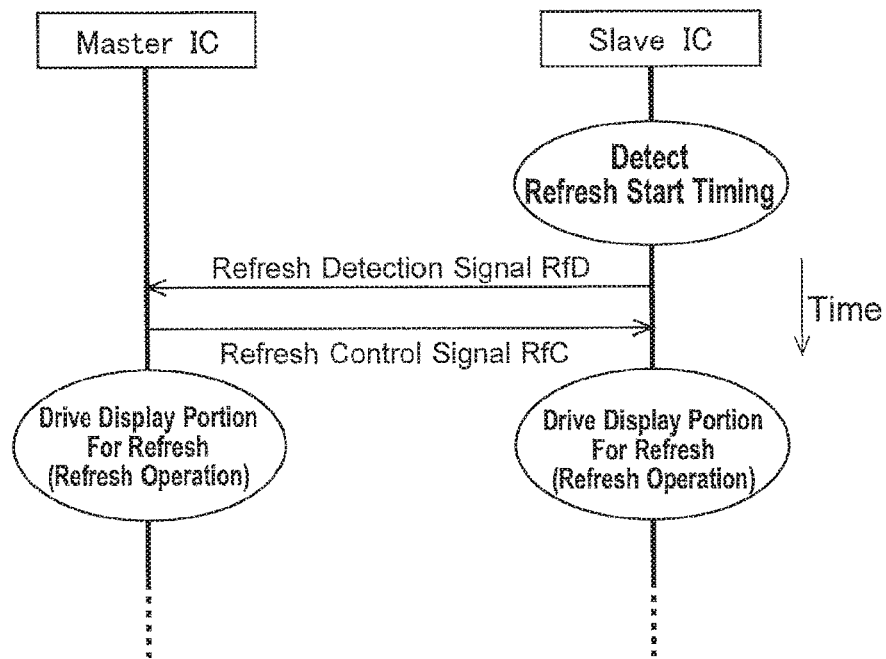
FIG. 12 is a sequence diagram showing one example of an operation for synchronization in the case of employing the third configuration example in the first embodiment.

FIG. 12 is a sequence diagram showing an example of operation for synchronizing refresh in a case where the slave IC 300R detects the refresh start timing by using the REF (Half) 305R earlier than the master IC 300L does (this also applies to a case where only the REF (Half) 305R of the slave IC 300R detects the refresh start timing). In this case, upon detection of the refresh start timing by using the REF (Half) 305R, the slave IC 300R transmits the refresh detection signal RfD indicating the refresh start timing to the master IC 300L. Upon receipt of this refresh detection signal RfD, the master IC 300L provides the M/S detection synchronization circuit 308L with the refresh detection signal RfD while generating the refresh control signal RfC instructing starting of the refresh operation and transmitting it to the slave IC 300R. When the refresh detection signal RfD from the slave IC 300R is thus inputted into the M/S detection synchronization circuit 308L, the master IC 300L starts the refresh operation on the left active area 100L of the display portion 100 (drive of the source lines in the left active area 100L based on the left-half data DaL stored in the 1/2 RAM 306L). Upon receipt of the refresh control signal RfC from the master IC 300L, the slave IC 300R starts the refresh operation on the right active area 100R of the display portion 100 (drive of the source lines in the right active area 100R based on the right-half data DaR stored in 1/2 RAM 306R). In this manner, the refresh of the display image in the left active area 100L performed by the master IC 300L and the refresh of the display image in the right active area 100R performed by the slave IC 300R are synchronized.

Figure 13:
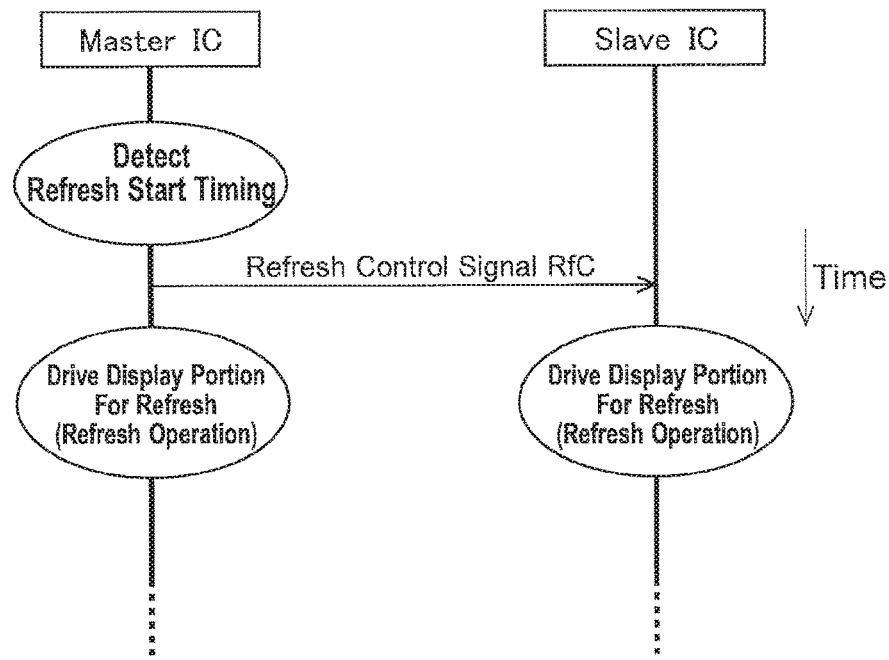
FIG. 13 is a sequence diagram showing another example of the operation for synchronization in the case of employing the third configuration example in the first embodiment.

FIG. 13 is a sequence diagram showing an example of the operation for synchronizing refresh in a case where the master IC 300L detects the refresh start timing by using the REF (Half) 305L earlier than the slave IC 300R does (this also applies to a case where only the REF (Half) 305L of the master IC 300L detects the refresh start timing). In this case, upon detection of the refresh start timing by using the REF (Half) 305L, the master IC 300L generates the refresh control signal RfC instructing starting of the refresh operation and provides the M/S detection synchronization circuit 308L with this refresh control signal RfC while transmitting this refresh control signal RfC to the slave IC 300R. When the refresh control signal RfC is thus inputted into the M/S detection synchronization circuit 308L, master IC 300L starts the refresh operation on the left active area 100L of the display portion 100 (drive of the source lines in the left active area 100L based on the left-half data DaL stored in the 1/2 RAM 306L). Upon receipt of the refresh control signal RfC from the master IC 300L, the slave IC 300R starts the refresh operation on the right active area 100R of the display portion 100 (drive of the source lines in the right active area 100R based on the right-half data DaR stored in the 1/2 RAM 306R). In this manner, the refresh of the display image in the left active area 100L performed by the master IC 300L and the refresh of the display image in the right active area 100R performed by the slave IC 300R are synchronized.

According to the present configuration example as described above, even when any one of the master IC 300L and the slave IC 300R detects the refresh start timing earlier at the time of the image update, or even when only one of the master IC 300L and the slave IC 300R detects the refresh start timing, the refresh operation on the left active area 100L performed by the master IC 300L and the refresh operation on the right active area 100R performed by the slave IC 300R are executed in synchronization with each other. For this reason, even when the display portion 100 is driven by the two driver ICs 300L, 300R as in the present embodiment, abnormality such as display misalignment does not occur. Hence in the liquid crystal display device that performs pause drive, the display portion 100 is driven by the two driver ICs 300L, 300R to enable favorable display of a high-resolution image.

Further, in the present configuration example, since the start timing for each of both the refresh operation performed by the master IC 300L and the refresh operation performed by the slave IC 300R is controlled by the master IC 300L, the accuracy in synchronization of both of the above refresh is high compared with that in the previously described second configuration example. Meanwhile, in the present configuration example, when the refresh start timing is detected in the slave IC 300R, after the master IC having received the refresh detection signal RfD transmitted from the slave IC 300R transmits the refresh control signal RfC to the slave IC 300R, the refresh operations in the master IC 300L and the slave IC 300R are started. For this reason, in terms of the time from occurrence of an event that requires refresh to starting of refresh of a display image, namely the responsivity concerning refresh, the second configuration example is more advantageous than the present configuration example.

<1.4 Effect of First Embodiment>

According to the present embodiment as described above, since the refresh operation on the left active area 100L by the left driver IC (the master IC) 300L and the refresh operation on the right active area 100R by the right drive IC (the slave IC) 300R are performed in synchronization with each other, abnormality such as display misalignment does not occur even when the display portion 100 is driven by the two driver ICs 300L, 300R. Hence in the liquid crystal display device that performs pause drive, the display portion 100 is driven by the two driver ICs 300L, 300R to enable favorable display of a high-resolution image.

Further, when each of the driver ICs 300L, 300R stores in the 1/2 RAM on the inside thereof data for displaying an image in the corresponding sub-display area (the left active area 100L or right active area 100R) as drive data from among image data (one-screen data Da) received from the host 80 and generates the refresh control signal RfC as refresh start information, or receives either the refresh control signal RfC or the refresh detection signal RfC as the refresh start information, then the relevant driver IC drives the display portion 100 such that the image is displayed in the corresponding sub-display area based on the drive data stored in the 1/2 RAM. The following effect is obtained by thus driving the display portion 100 based on the drive data stored in the rewritable memories (the 1/2 RAMs): without being provided with any control signals indicating display timing from the host 80, each driver IC can generate such a control signal therein. Moreover, even if only a portion of one-screen data Da is provided from the host 80 as refresh data to update only a portion of the display image, the refresh operation are performed on the whole display portion 100 (both of the left active area 100L and right active area 100R). For example, even if data of an image to be displayed in one of the left and right active areas 100L, 100R is transferred to only one of the left and right driver ICs 300L, 300R, the display image in the whole active area 100 can be refreshed. Furthermore, in this case, since image data for the refresh is not transferred from the host 80 to the other of the left and right driver ICs 300L, 300R, the amount of input data from the host 80 is reduced and the power consumption in the interface for data transfer from the host 80 to the display device is also reduced.

2. Second Embodiment

Figure 14:
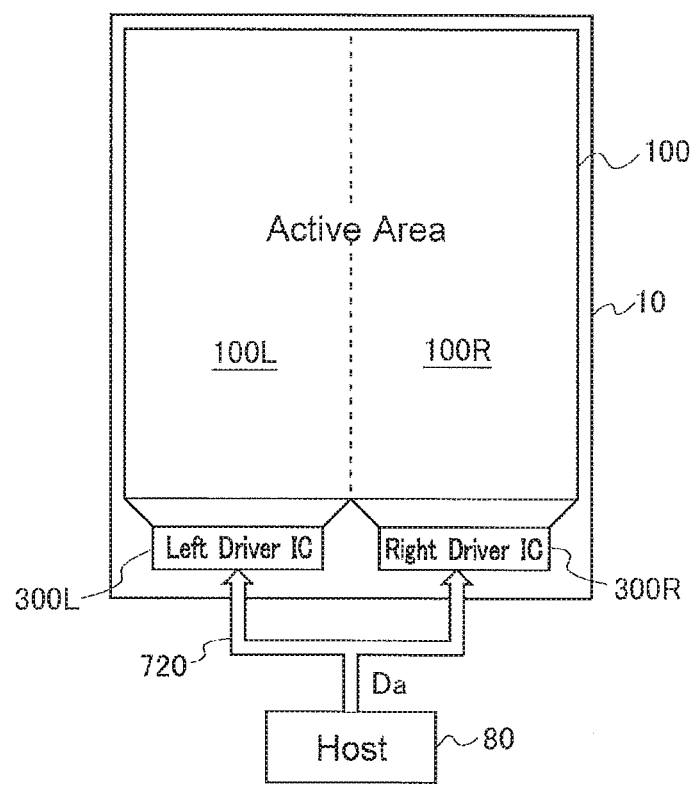
FIG. 14 is a diagram showing a whole configuration of a liquid crystal display device according to a second embodiment of the present invention.

FIG. 14 is a diagram showing a whole configuration of a liquid crystal display device according to a second embodiment of the present invention. This liquid crystal display device has a similar configuration to that of the above first embodiment except for the configuration concerning connection with the host 80. For this reason, the same or corresponding part is provided with the same reference numeral, a detailed description concerning the present embodiment is omitted, and hereinafter, a description is focused on a different part from the first embodiment. In addition, similarly to the first embodiment, the present embodiment is configured so as to be able to perform pause drive (see FIG. 8).

(The ICON in) each of both the left and right driver ICs 300L, 300R in the present embodiment is also connected with the host 80 by the previously described appropriate interface, such as the interface conforming to MIPI-DSI standard. However, in the present embodiment, differently from the first embodiment, there is realized a data path 720 for transferring data (hereinafter also referred to as "one-screen data") Da corresponding to a whole image to be displayed on the display portion (active area) 100, namely an image for one screen, to both the left and right driver ICs 300L, 300R in accordance with the interface, thereby transferring the one-screen data Da from the host 80 to both the left and right driver ICs 300L, 300R. It is to be noted that in addition to the input image data representing the image to be displayed in the active area 100, the one-screen data Da includes timing information (a synchronization signal, a data enable signal, a clock signal, etc.) required for displaying the image.

The present embodiment has a configuration as described below so as to synchronize refresh performed by the left driver IC 300L and refresh performed by the right driver IC 300R.

<2.1 First Configuration Example for Synchronizing Refresh>

Figure 15:
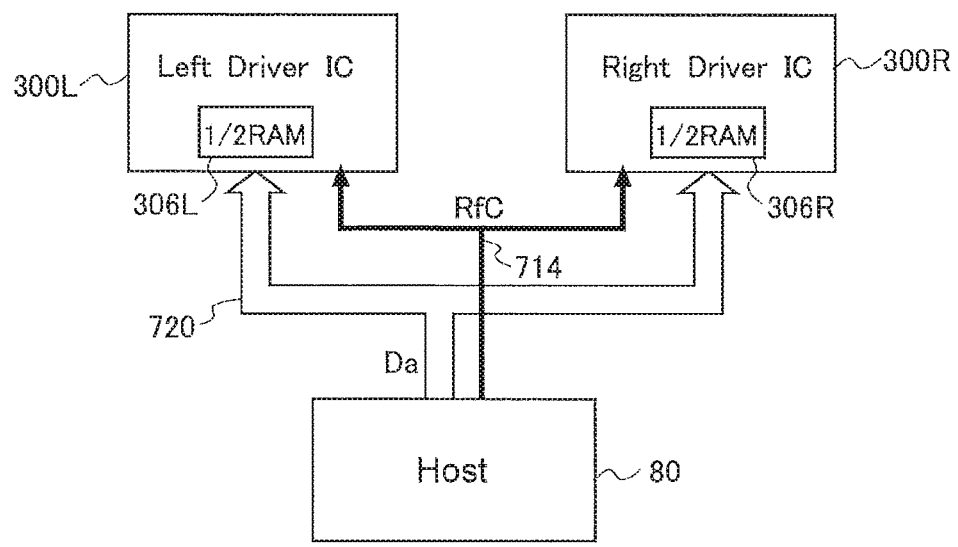
FIG. 15 is a block diagram showing a first configuration example for synchronizing refresh in the second embodiment.

FIG. 15 is a block diagram showing a first configuration example for synchronizing refresh in the present embodiment. The present configuration example has a similar configuration to that of the first configuration example (FIG. 9) in the first embodiment except for formation of the data path 720 for transferring the one-screen data Da from the host 80 to both the left and right driver ICs 300L, 300R. Accordingly, in the present configuration example, the same part as that in the first configuration example of the first embodiment is provided with the same reference numeral, and a detailed description thereof is omitted.

When the image update is to be performed, refresh data that is one-screen data Da for displaying a new image by the image update is transferred to both the left and right driver ICs 300L, 300R, and the refresh control signal RfC instructing starting of refresh of the display image in the active area 100 based on this refresh data is transferred from the host 80 to the left and right driver ICs 300L, 300R. (The ICON in) each of both the left and right driver ICs 300L, 300R receives the one-screen data Da from the host 80, and receives the refresh control signal RfC.

In the left driver IC 300L, when receiving the one-screen data Da, the ICON stores data for refreshing the display image in the left active area 100L from among the received one-screen data Da, namely left-half data DaL, in the 1/2 RAM 306L as drive data. Further, when receiving the refresh control signal RfC in addition to the one-screen data Da, the ICON generates an image signal and a control signal for causing the SD to operate based on the left-half data DaL stored in the 1/2 RAM 306L, and outputs these signals to the SD at the timing based on the refresh control signal RfC. Based on the image signal and the control signal, the SD applies data signals representing an image (left-half image) to be displayed in the left active area 100L to the respective source lines in the left active area 100L, thereby driving these source lines.

In the right driver IC 300R, when receiving the one-screen data Da, the ICON stores data for refreshing the display image in the right active area 100R from among the received one-screen data Da, namely right-half data DaR, in the 1/2 RAM 306R as drive data. Further, when receiving the refresh control signal RfC in addition to the one-screen data Da, the ICON generates an image signal and a control signal for causing the SD to operate based on the right-half data DaR stored in the 1/2 RAM 306R, and outputs these signals to the SD at the timing based on the refresh control signal RfC. Based on the image signal and the control signal, the SD applies data signals representing an image (left-half image) to be displayed in the right active area 100R to the respective source lines in the right active area 100R, thereby driving these source lines.

Operations other than the above in the present configuration example are similar to those in the first configuration example of the first embodiment, and hence a description thereof is omitted.

As seen from the above, since each of both the left and right driver ICs 300L, 300R drives the source lines based on the refresh control signal RfC of the host 80, the refresh of the display image in the left active area 100L performed by the left driver IC 300L and the refresh of the display image in the right active area 100R performed by the right driver IC 300R are synchronized. For this reason, even when the display portion 100 is driven by the two driver ICs 300L, 300R as in the present embodiment, abnormality such as display misalignment does not occur. As thus described, according to the present configuration example, a similar effect to that of the first configuration example of the first embodiment is exerted.

<2.2 Second Configuration Example for Synchronizing Refresh>

Figure 16:
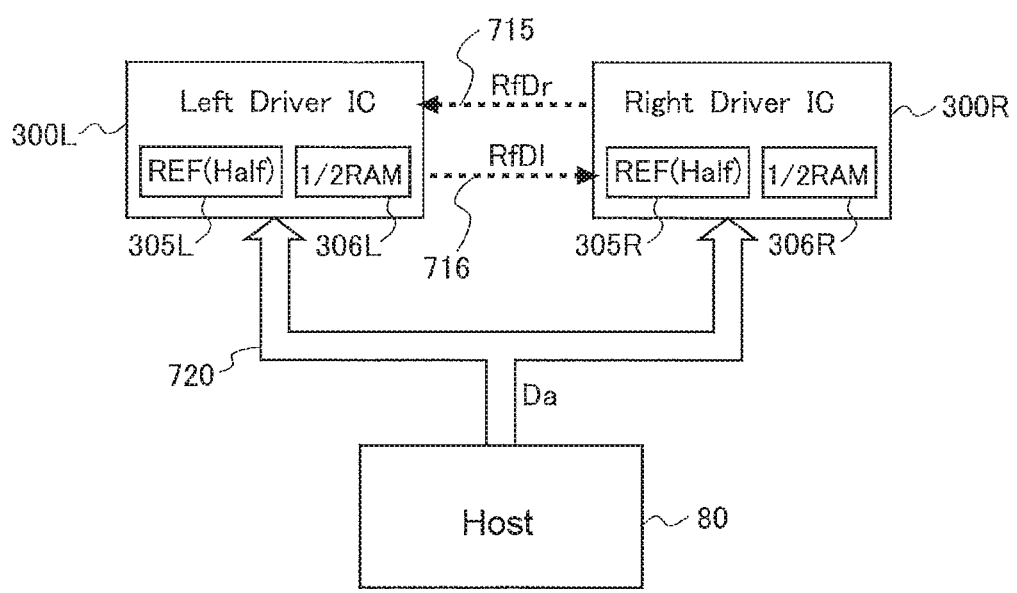
FIG. 16 is a block diagram showing a second configuration example for synchronizing refresh in the second embodiment.

FIG. 16 is a block diagram showing a second configuration example for synchronizing refresh in the present embodiment. The present configuration example has a similar configuration to that of the second configuration example (FIG. 10) in the first embodiment except for formation of the data path 720 for transferring the one-screen data Da from the host 80 to both the left and right driver ICs 300L, 300R. Accordingly, in the present configuration example, the same part as that in the second configuration example of the first embodiment is provided with the same reference numeral, and a detailed description thereof is omitted.

When the image update is to be performed in the present configuration example, refresh data that is one-screen data for displaying a new image by the image update is transferred to the left and right driver ICs 300L, 300R.

When receiving the one-screen data Da, the ICON of the left driver IC 300L stores data for refreshing the display image in the left active area 100L from among the received one-screen data Da, namely left-half data DaL, in the 1/2 RAM 306L as drive data. Further, based on the left-half data DaL, the REF (Half) 305L of the left driver IC 300L detects the start timing for the refresh operation for the image update. When the REF (Half) 305L detects the start timing for the refresh operation, the left driver IC 300L transmits the refresh detection signal RfDl indicating the start timing for the refresh operation to the right driver IC 300R, and starts the refresh operation (drive of the source lines in the left active area 100L based the left-half data DaL stored in the 1/2 RAM 306L) based on the start timing.

When receiving the one-screen data Da, the ICON of the right driver IC 300R stores data for refreshing the display image in the right active area 100R from among the received one-screen data Da, namely right-half data DaR, in the 1/2 RAM 306R as drive data. Further, based on the right-half data DaR, the REF (Half) 305R of the right driver IC 300R detects the start timing for the refresh operation for the image update. When the REF (Half) 305R detects the start timing for the refresh operation, the right driver IC 300R transmits the refresh detection signal RfDr indicating the start timing for the refresh operation to the left driver IC 300L, and starts the refresh operation (drive of the source lines in the right active area 100R based on the right-half data DaR stored in the 1/2 RAM 306R) based on the start timing.

Moreover, each of the left and right driver ICs 300L, 300R starts the refresh operation upon receipt of the refresh detection signal RfDl or RfDr from the other. However, in a case where the right driver IC 300R or the left driver IC 300L upon receipt of the fresh detection signal RfDl or RfDr has detected the refresh start timing in the REF (Half) on the inside thereof and has already started the refresh operation, the right driver IC 300R or the left driver IC 300L continues the already started refresh operation.

According to the present configuration example as thus described, a similar effect to that of the second configuration example of the first embodiment is exerted, and the refresh of the display image in the left active area 100L performed by the left driver IC 300L and the refresh of the display image in the right active area 100R performed by the right driver IC 300R are synchronized. For this reason, even when the display portion 100 is driven by the two driver ICs 300L, 300R as in the present embodiment, abnormality such as display misalignment does not occur.

<2.3 Third Configuration Example for Synchronizing Refresh>

Figure 17:
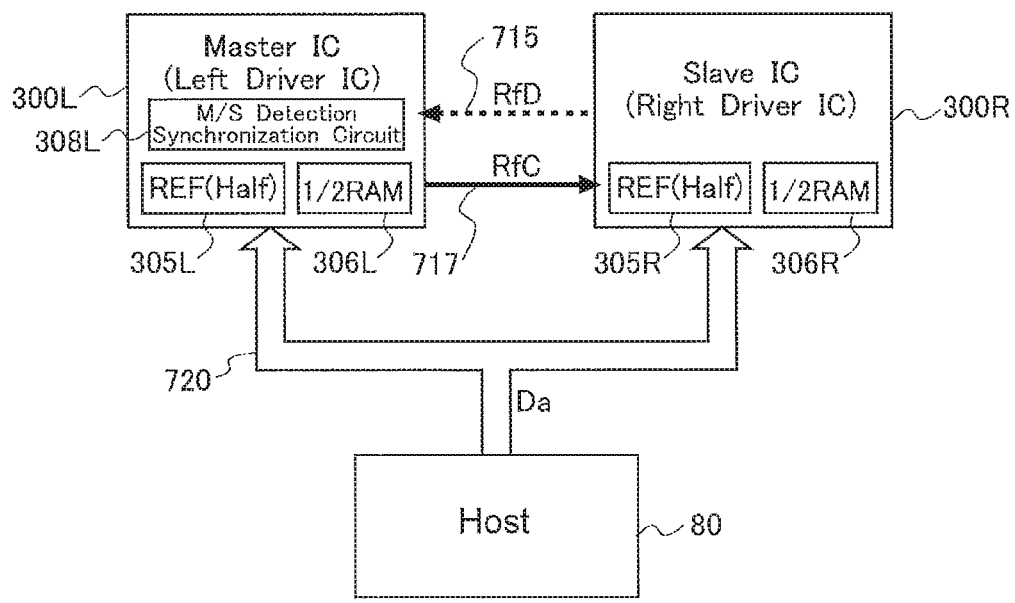
FIG. 17 is a block diagram showing a third configuration example for synchronizing refresh in the second embodiment.

FIG. 17 is a block diagram showing a third configuration example for synchronizing refresh in the present embodiment. The present configuration example has a similar configuration to that of the third configuration example (FIG. 11) in the first embodiment except for formation of the data path 720 for transferring the one-screen data Da from the host 80 to both the left and right driver ICs 300L, 300R. Accordingly, in the present configuration example, the same part as that in the third configuration example in the first embodiment is provided with the same reference numeral, and a detailed description thereof is omitted. In addition, as shown in FIG. 17, in the present configuration example, the left driver IC 300L is taken as the master IC, and the right driver IC 300R is taken as the slave IC.

When the image update is to be performed in the present configuration example, refresh data that is one-screen data for displaying a new image by the image update is transferred to the master IC (left driver IC) 300L and the slave IC (right driver IC) 300R. The TCON of the master IC 300L, when receiving the one-screen data Da, stores left-half data DaL from among the received one-screen data Da in the 1/2 RAM 306L as drive data. The TCON of the salve IC 300R, when receiving the one-screen data Da, stores right-half data DaR from among the received one-screen data Da in the 1/2 RAM 306R as drive data. Further, the REF (Half) 305L of the master IC 300L detects the start timing for the refresh operation for the image update based on the left-half data DaL from among the one-screen data Da, and the REF (Half) 305R of the slave IC 300R detects the start timing for the refresh operation for the image update based on the right-half data DaR from among the one-screen data Da.

Operations other than the above in the present configuration example are similar to those in the third configuration example in the first embodiment (see FIGS. 12 and 13).

According to the present configuration example as thus described, a similar effect to that of the third configuration example of the first embodiment is exerted, and the refresh of the display image in the left active area 100L performed by the left driver IC 300L and the refresh of the display image in the right active area 100R performed by the right driver IC 300R are synchronized. For this reason, even when the display portion 100 is driven by the two driver ICs 300L, 300R as in the present embodiment, abnormality such as display misalignment does not occur.

<2.4 Fourth Configuration Example for Synchronizing Refresh>

Figure 18:
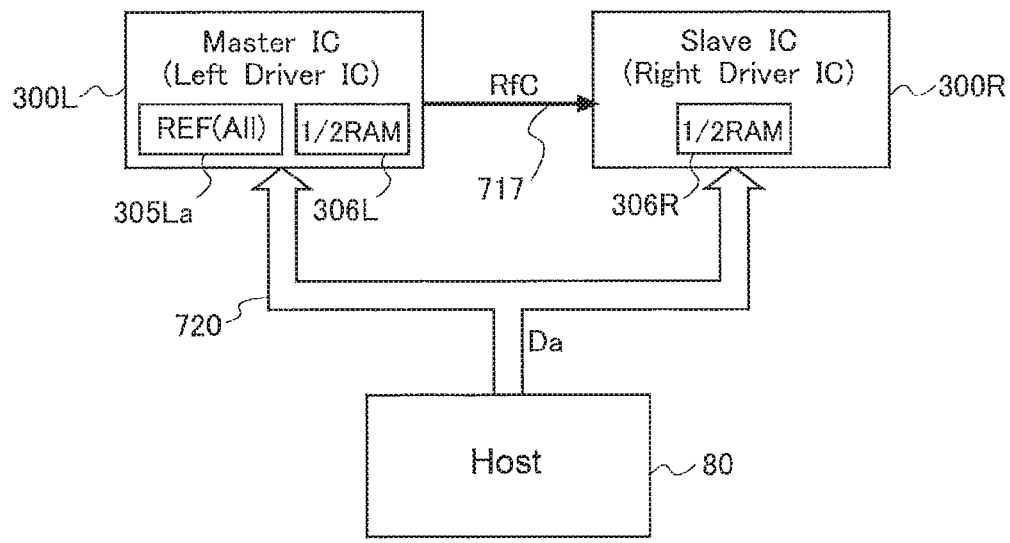
FIG. 18 is a block diagram showing a fourth configuration example for synchronizing refresh in the second embodiment.

FIG. 18 is a block diagram showing a fourth configuration example for synchronizing refresh in the present embodiment. The present configuration example shows a modified example of the third configuration example (FIG. 17), the master IC (left driver IC) 300L has a REF (All) 305La built therein as the refresh detection portion in place of the REF (Half) 305L, and the slave IC (right driver IC) 300R does not have the refresh detection portion REF (Half) built therein, and no signal path for transmitting a refresh detection signal is provided. The other parts in the present configuration example have similar configurations to those in the above third configuration example (FIG. 17).

When the image update is to be performed in the present configuration example, refresh data that is one-screen data Da for displaying a new image by the image update is transferred to the master IC (left driver IC) 300L and the slave IC (right driver IC) 300R. The ICON of the master IC 300L, when receiving the one-screen data Da, stores left-half data DaL from among the received one-screen data Da in the 1/2 RAM 306L as drive data. The TCON of the salve IC 300R, when receiving the one-screen data Da, stores right-half data DaR from among the received one-screen data Da in the 1/2 RAM 306R as drive data. Further, the REF (All) 305L of the master IC 300L detects the start timing for the refresh operation for the image update based on the one-screen data Da from the host 80. Hence the master IC 300L can detect the refresh start timing by determining a change in image to be displayed in the right active area 100R as well as a change in image to be displayed in the left active area 100L, and the slave IC 300R does not need to detect the refresh start timing.

Upon detection of the refresh start timing based on the one-screen data Da from the host 80, the master IC 300L transmits the refresh control signal RfC instructing starting of the refresh operation to the slave IC 300R, and starts the refresh operation on the left active area 100L (drive of the source lines in the left active area 100L based on the left-half data DaL stored in the 1/2 RAM 306L) based on the start timing. Upon receipt of this refresh control signal RfC, the slave IC 300R starts the refresh operation on the right active area 100R (drive of the source lines in the right active area 100R based on the right-half data DaR stored in the 1/2 RAM 306R).

According to the present configuration example as thus described, a similar effect to that of the third configuration example (FIG. 17) of the present embodiment is exerted, and the refresh of the display image in the left active area 100L performed by the left driver IC 300L and the refresh of the display image in the right active area 100R performed by the right driver IC 300R are synchronized. For this reason, even when the display portion 100 is driven by the two driver ICs 300L, 300R as in the present embodiment, abnormality such as display misalignment does not occur. It is to be noted that in the present configuration example, only the master IC 300L performs the detection of the start timing for a refresh operation as well as the control of the start timing, and hence the present configuration example is more advantageous than the third configuration example of the present embodiment in terms of the responsivity concerning the refresh.

<2.5 Fifth Configuration Example for Synchronizing Refresh>

Figure 19:
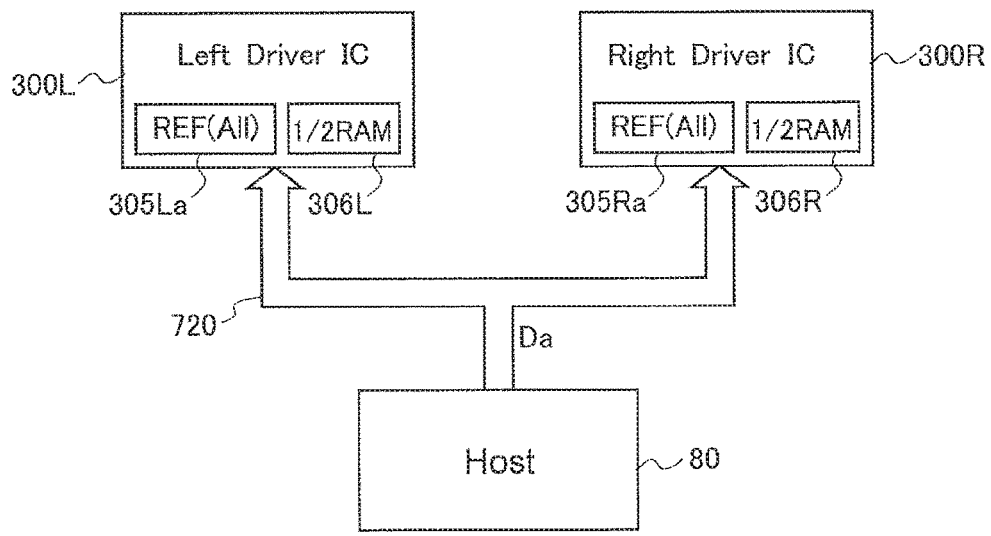
FIG. 19 is a block diagram showing a fifth configuration example for synchronizing refresh in the second embodiment.

FIG. 19 is a block diagram showing a fifth configuration example for synchronizing refresh in the present embodiment. In the present configuration example, the left and right driver ICs 300L, 300R respectively have a REF (All) 305La and a REF (All) 305Ra built therein as the refresh detection portion as well as respectively have 1/2 RAM 306L and 1/2 RAM 306R as rewritable memories for temporarily storing display image data received from the host 80, and neither of them is provided with a signal path for transmitting a refresh detection signal or a signal path for transmitting a refresh control signal.

When the image update is to be performed in the present configuration example, the one-screen data Da for displaying a new image by the image update is transferred as the refresh data to the left driver IC 300L and the right driver IC 300R. The ICON of the left driver IC 300L, when receiving the one-screen data Da, stores left-half data DaL from among the received one-screen data Da in the 1/2 RAM 306L as drive data. The ICON of the right driver IC 300R, when receiving the one-screen data Da, stores right-half data DaR from among the received one-screen data Da in the 1/2 RAM 306R as drive data. Further, each of both the REF (All) 305La of the left driver IC 300L and the REF (All) 305Ra of the left driver IC 300R detects the start timing for the refresh operation for the image update based on the one-screen data Da. Hence each of both the left and right driver ICs 300L, 300R can determine both a change in image to be displayed in the left active area 100L and a change in image to be displayed in the right active area 100R, and can detect the refresh start timing in accordance with results of the determination.

Upon detection of the start timing for the refresh operation for the image update by using the REF (All) 305La based on the one-screen data Da from the host 80, the left driver IC 300L starts the refresh operation on the left active area 100L (drive of the source lines in the left active area 100L based on the left-half data DaL stored in the 1/2 RAM 306L). Upon detection of the start timing for the refresh operation for the image update by using the REF (All) 305Ra based on the one-screen data Da from the host 80, the right driver IC 300R starts the refresh operation on the right active area 100R (drive of the source lines in the right active area 100R based on the right-half data DaR stored in the 1/2 RAM 306R).

According to the present configuration example as described above, since the refresh start timing is detected in the left and right driver ICs 300L, 300R based on the one-screen data Da from the host 80, the refresh of the display image in the left active area 100L performed by the left driver IC 300L and the refresh of the display image in the right active area 100R performed by the right driver IC 300R are synchronized. For this reason, even when the display portion 100 is driven by the two driver ICs 300L, 300R as in the present embodiment, abnormality such as display misalignment does not occur. In addition, in the present configuration example, it is not necessary to provide a signal path for a refresh detection signal or a refresh control signal between the driver ICs or between the driver IC and the host 80, and hence the present configuration example is more advantageous than the other configuration examples in terms of simplification of the signal path.

<2.6 Effect of Second Embodiment>

According to the present embodiment as described above, similarly to the first embodiment, since the refresh operation on the left active area 100L by the left driver IC (the master IC) 300L and the refresh operation on the right active area 100R by the right drive IC (the slave IC) 300R are performed in synchronization with each other, abnormality such as display misalignment does not occur even when the display portion 100 is driven by the two driver ICs 300L, 300R. Hence, in the liquid crystal display device that performs pause drive, the display portion 100 is driven by the two driver ICs 300L, 300R to enable favorable display of a high-resolution image.

Further, also in the present embodiment, similarly to the first embodiment, since the display portion 100 is driven based on the drive data stored in the rewritable memories (the 1/2 RAMs), the following effect is obtained: without being provided with any control signals indicating display timing from the host 80, each driver IC can generate such a control signal therein. Moreover, even if only a portion of one-screen data Da is provided from the host 80 as refresh data to update only a portion of the display image, the refresh operation are performed on the whole display portion 100 by the driver ICs 300L, 300R.

3. Third Embodiment

Figure 20:
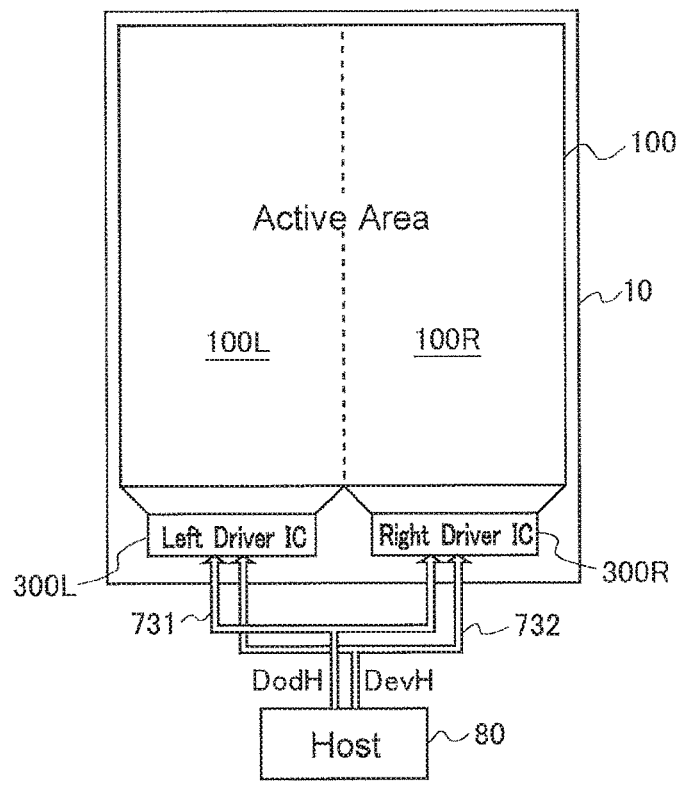
FIG. 20 is a diagram showing a whole configuration of a liquid crystal display device according to a third embodiment of the present invention.

FIG. 20 is a diagram showing a whole configuration of a liquid crystal display device according to a third embodiment of the present invention. This liquid crystal display device has a similar configuration to that of the above second embodiment except for the configuration concerning connection with the host 80. For this reason, the same or corresponding part is provided with the same reference numeral, a detailed description concerning the present embodiment is omitted, and hereinafter, a description is focused on a different part from the second embodiment. In addition, similarly to the first and second embodiments, the present embodiment is configured so as to be able to perform pause drive (see FIG. 8).

(The TCON in) each of both the left and right driver ICs 300L, 300R in the present embodiment is also connected with the host 80 by the appropriate interface described above, such as an interface conforming to MIPI-DSI standard. Further, also in the present embodiment, similarly to the second embodiment, one-screen data corresponding to a whole image to be displayed on the display portion (active area) 100, namely an image for one screen is transferred to the left and right driver ICs 300L, 300R in accordance with the interface. However, in the present embodiment, two-system data paths for dividing one-screen data into two half-screen data and transferring the half-screen data from the host 80 to the left and right driver ICs 300L, 300R are formed based on the interface. One of the two-system data paths is a data path (hereinafter referred to as an "odd sub data path") 731 for transferring odd column data DodH out of the odd column data DodH and even column data DevH corresponding to two images obtained by horizontally dividing a one-screen image into two images by use of odd and even numbers, and the other is a data path (hereinafter referred to as an "even sub data path") 732 for transferring the even column data DevH. Herein, the "odd column data DodH" corresponds to an image made up of odd-numbered pixel columns in a pixel matrix constituting the one-screen image, and the "even column data DevH" corresponds to an image made up of even-numbered pixel columns in the pixel matrix. Further, the "pixel column" means a column made up of pixels aligned in a vertical direction, namely an extending direction of the source line. In the present embodiment, each of the driver ICs 300L, 300R receives the odd column data DodH via the odd sub data path 731, and receives the even column data DevH via the even sub data path 732, whereby input data for each one-line data corresponding to one pixel row aligned along the gate line in the pixel matrix can be provided from the outside.

As described above, the present embodiment is similar to the second embodiment in that the one-screen data is transferred to the left and right driver ICs 300L, 300R, but is advantageous in that an operation frequency for data transfer is low due to the use of the two-system data paths 731, 732 for transfer of the one-screen data.

The present embodiment has a configuration as described below so as to synchronize refresh performed by the left driver IC 300L and refresh performed by the right driver IC 300R.

<3.1 First Configuration Example for Synchronizing Refresh>

Figure 21:
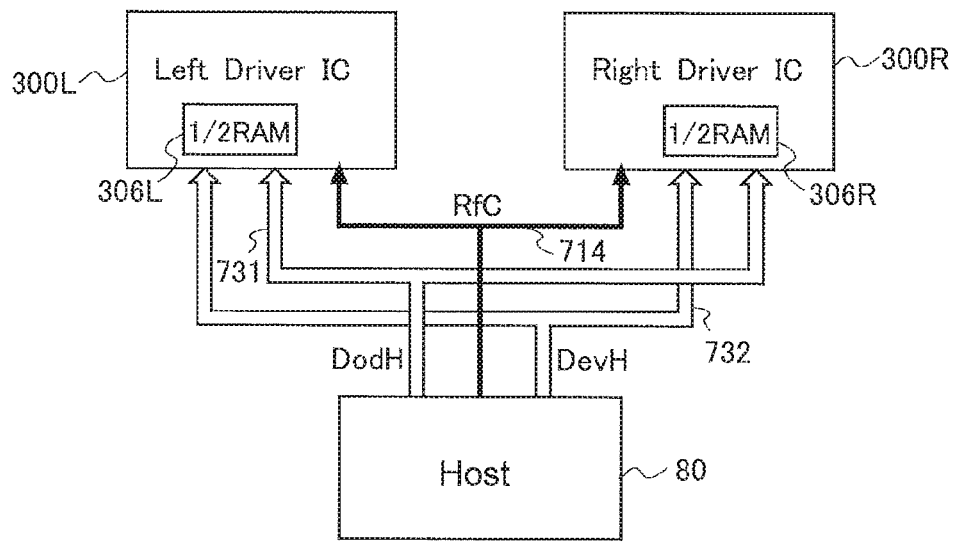
FIG. 21 is a block diagram showing a first configuration example for synchronizing refresh in the third embodiment.

FIG. 21 is a block diagram showing a first configuration example for synchronizing refresh in the present embodiment. The present configuration example has a similar configuration to that of the first configuration example (FIG. 15) in the second embodiment except for formation of the previously described two-system data paths, namely the odd sub data path 731 and the even sub data path 732, between the host 80 and the left and right driver ICs 300L, 300R. Accordingly, in the present configuration example, the same part as that in the first configuration example of the second embodiment is provided with the same reference numeral, and a detailed description thereof is omitted.

When the image update is to be performed, refresh data that is one-screen data for displaying a new image by the image update is divided into the odd column data DodH and the even column data DevH, and then transferred to the left and right driver ICs 300L, 300R through the odd sub data path 731 and the even sub data path 732, and the refresh control signal RfC instructing starting of refresh of the display image in the active area 100 based on this refresh data is transferred from the host 80 to the left and right driver ICs 300L, 300R. Each of both the left and right driver ICs 300L, 300R receives one-screen data made up of the odd column data DodH and the even column data DevH, and receives the refresh control signal RfC. As described above, the present embodiment is similar to the second embodiment in that each of both the left and right driver ICs 300L, 300R receives the one-screen data, and hence the operation of each of the left and right driver ICs 300L, 300R in the present configuration example hereinafter is similar to that in the first configuration example (FIG. 15) of the second embodiment.

According to the present configuration example as thus described, a similar effect to that of the first configuration example of the second embodiment is exerted, and even when the display portion 100 is driven by the two driver ICs 300L, 300R as in the present embodiment, abnormality such as display misalignment does not occur.

<3.2 Second Configuration Example for Synchronizing Refresh>

Figure 22:
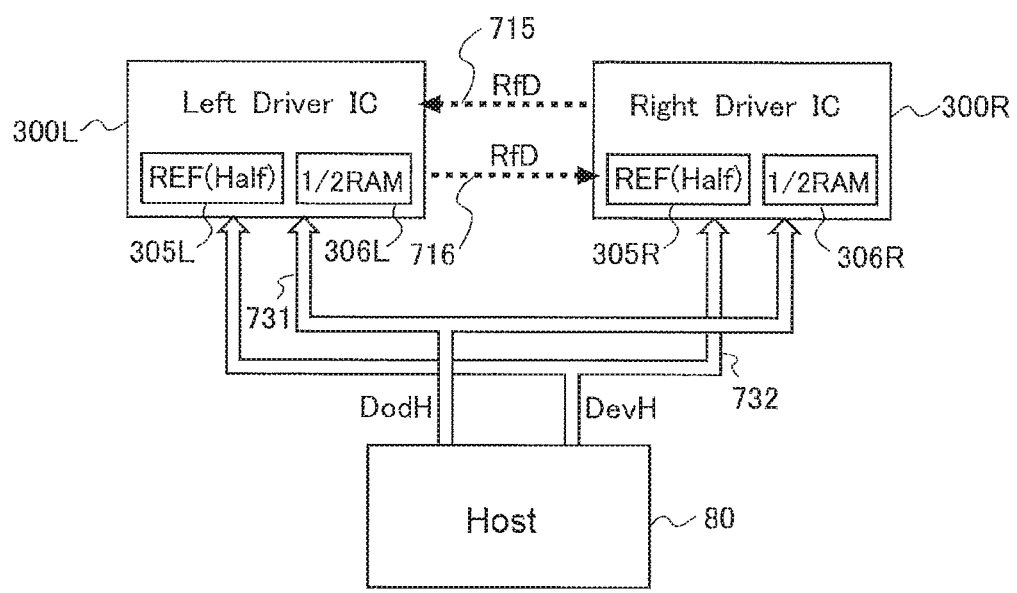
FIG. 22 is a block diagram showing a second configuration example for synchronizing refresh in the third embodiment.

FIG. 22 is a block diagram showing a second configuration example for synchronizing refresh in the present embodiment. The present configuration example has a similar configuration to that of the second configuration example (FIG. 16) in the second embodiment except for formation of the previously described two-system data paths, namely the odd sub data path 731 and the even sub data path 732, between the host 80 and the left and right driver ICs 300L, 300R. Accordingly, in the present configuration example, the same part as that in the second configuration example of the second embodiment is provided with the same reference numeral, and a detailed description thereof is omitted.

When the image update is to be performed, refresh data that is one-screen data for displaying a new image by the image update is divided into the odd column data DodH and the even column data DevH, and then transferred to the left and right driver ICs 300L, 300R through the odd sub data path 731 and the even sub data path 732. Each of both the left and right driver ICs 300L, 300R receives one-screen data made up of the odd column data DodH and the even column data DevH. As described above, the present embodiment is similar to the second embodiment in that each of both the left and right driver ICs 300L, 300R receives the one-screen data, and hence the operation of each of the left and right driver ICs 300L, 300R in the present configuration example hereinafter is similar to that in the second configuration example (FIG. 16) of the second embodiment.

According to the present configuration example as thus described, a similar effect to that of the second configuration example of the second embodiment is exerted, and even when the display portion 100 is driven by the two driver ICs 300L, 300R as in the present embodiment, abnormality such as display misalignment does not occur.

<3.3 Third Configuration Example for Synchronizing Refresh>

Figure 23:
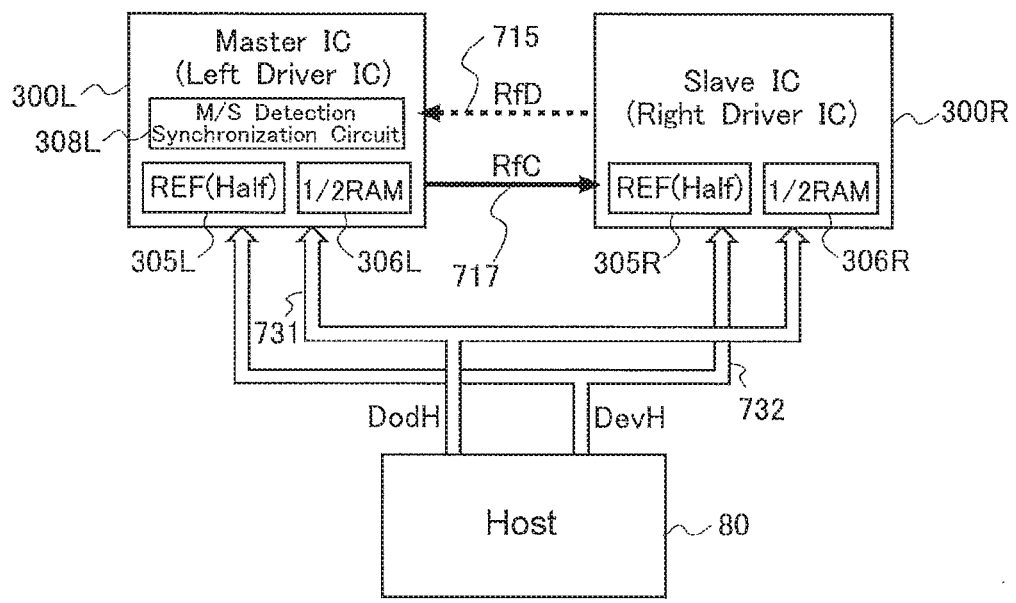
FIG. 23 is a block diagram showing a third configuration example for synchronizing refresh in the third embodiment.

FIG. 23 is a block diagram showing a third configuration example for synchronizing refresh in the present embodiment. The present configuration example has a similar configuration to that of the third configuration example (FIG. 17) in the second embodiment except for formation of the previously described two-system data paths, namely the odd sub data path 731 and the even sub data path 732, between the host 80 and the left and right driver ICs 300L, 300R. Accordingly, in the present configuration example, the same part as that in the third configuration example of the second embodiment is provided with the same reference numeral, and a detailed description thereof is omitted.

When the image update is to be performed, refresh data that is one-screen data for displaying a new image by the image update is divided into the odd column data DodH and the even column data DevH, and then transferred to the left and right driver ICs 300L, 300R through the odd sub data path 731 and the even sub data path 732. Each of both the left and right driver ICs 300L, 300R receives one-screen data made up of the odd column data DodH and the even column data DevH. As described above, the present embodiment is similar to the second embodiment in that each of both the left and right driver ICs 300L, 300R receives the one-screen data, and hence the operation of each of the left and right driver ICs 300L, 300R in the present configuration example hereinafter is similar to that in the third configuration example (FIG. 17) of the second embodiment.

According to the present configuration example as thus described, a similar effect to that of the third configuration example of the second embodiment is exerted, and even when the display portion 100 is driven by the two driver ICs 300L, 300R as in the present embodiment, abnormality such as display misalignment does not occur.

<3.4 Fourth Configuration Example for Synchronizing Refresh>

Figure 24:
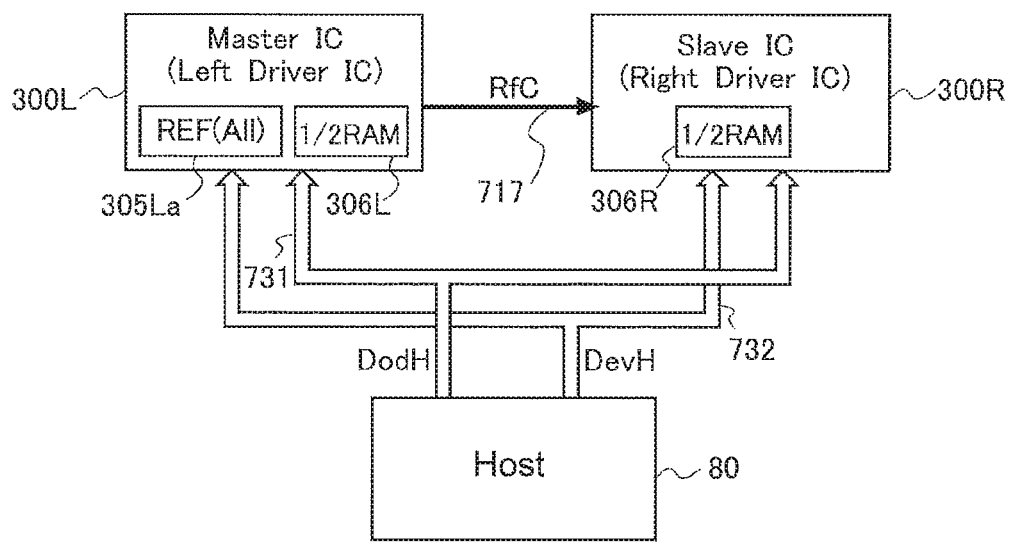
FIG. 24 is a block diagram showing a fourth configuration example for synchronizing refresh in the third embodiment.

FIG. 24 is a block diagram showing a fourth configuration example for synchronizing refresh in the present embodiment. The present configuration example has a similar configuration to that of the fourth configuration example (FIG. 18) in the second embodiment except for formation of the previously described two-system data paths, namely the odd sub data path 731 and the even sub data path 732, between the host 80 and the left and right driver ICs 300L, 300R. Accordingly, in the present configuration example, the same part as that in the fourth configuration example of the second embodiment is provided with the same reference numeral, and a detailed description thereof is omitted.

When the image update is to be performed, refresh data that is one-screen data for displaying a new image by the image update is divided into the odd column data DodH and the even column data DevH, and then transferred to the left and right driver ICs 300L, 300R through the odd sub data path 731 and the even sub data path 732. Each of both the left and right driver ICs 300L, 300R receives one-screen data made up of the odd column data DodH and the even column data DevH. As described above, the present embodiment is similar to the second embodiment in that each of both the left and right driver ICs 300L, 300R receives the one-screen data, and hence the operation of each of the left and right driver ICs 300L, 300R in the present configuration example hereinafter is similar to that in the fourth configuration example (FIG. 18) of the second embodiment.

According to the present configuration example as thus described, a similar effect to that of the fourth configuration example of the second embodiment is exerted, and even when the display portion 100 is driven by the two driver ICs 300L, 300R as in the present embodiment, abnormality such as display misalignment does not occur.

<3.5 Fifth Configuration Example for Synchronizing Refresh>

Figure 25:
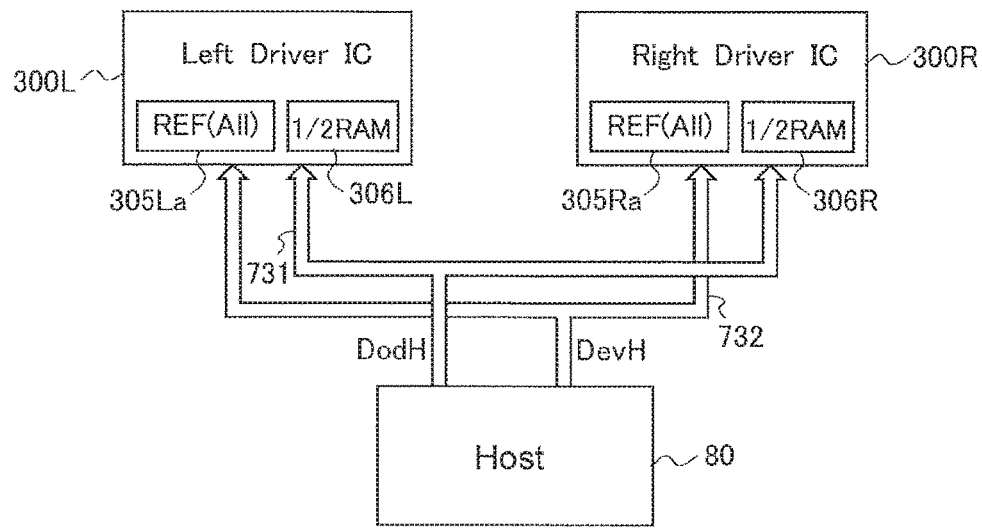
FIG. 25 is a block diagram showing a fifth configuration example for synchronizing refresh in the third embodiment.

FIG. 25 is a block diagram showing a fifth configuration example for synchronizing refresh in the present embodiment. The present configuration example has a similar configuration to that of the fifth configuration example (FIG. 19) in the second embodiment except that the two-system data paths, namely the odd sub data path 731 and the even sub data path 732 are formed so as to divide one-screen data into the odd column data DodH and the even column data DevH and transfer the divided data from the host 80 to the left and right driver ICs 300L, 300R. Accordingly, in the present configuration example, the same part as that in the fifth configuration example of the second embodiment is provided with the same reference numeral, and a detailed description thereof is omitted.

When the image update is to be performed, refresh data that is one-screen data for displaying a new image by the image update is divided into the odd column data DodH and the even column data DevH, and then transferred to the left and right driver ICs 300L, 300R through the odd sub data path 731 and the even sub data path 732. Each of both the left and right driver ICs 300L, 300R receives one-screen data made up of the odd column data DodH and the even column data DevH. As described above, the present embodiment is similar to the second embodiment in that each of both the left and right driver ICs 300L, 300R receives the one-screen data, and hence the operation of each of the left and right driver ICs 300L, 300R in the present configuration example hereinafter is similar to that in the fifth configuration example (FIG. 19) of the second embodiment.

According to the present configuration example as thus described, a similar effect to that of the fifth configuration example of the second embodiment is exerted, and even when the display portion 100 is driven by the two driver ICs 300L, 300R as in the present embodiment, abnormality such as display misalignment does not occur.

<3.6 Effect of Third Embodiment>

According to the present embodiment as described above, similarly to the first embodiment, since the refresh operation on the left active area 100L by the left driver IC (the master IC) 300L and the refresh operation on the right active area 100R by the right drive IC (the slave IC) 300R are performed in synchronization with each other, abnormality such as display misalignment does not occur even when the display portion 100 is driven by the two driver ICs 300L, 300R. Hence in the liquid crystal display device that performs pause drive, the display portion 100 is driven by the two driver ICs 300L, 300R to enable favorable display of a high-resolution image.

Further, also in the present embodiment, similarly to the first embodiment, since the display portion 100 is driven based on the drive data stored in the rewritable memories (the 1/2 RAMs), the following effect is obtained: without being provided with any control signals indicating display timing from the host 80, each driver IC can generate such a control signal therein. Moreover, even if only a portion of one-screen data Da is provided from the host 80 as refresh data to update only a portion of the display image, the refresh operation are performed on the whole display portion 100 by the driver ICs 300L, 300R.

4. Fourth Embodiment

Figure 26:
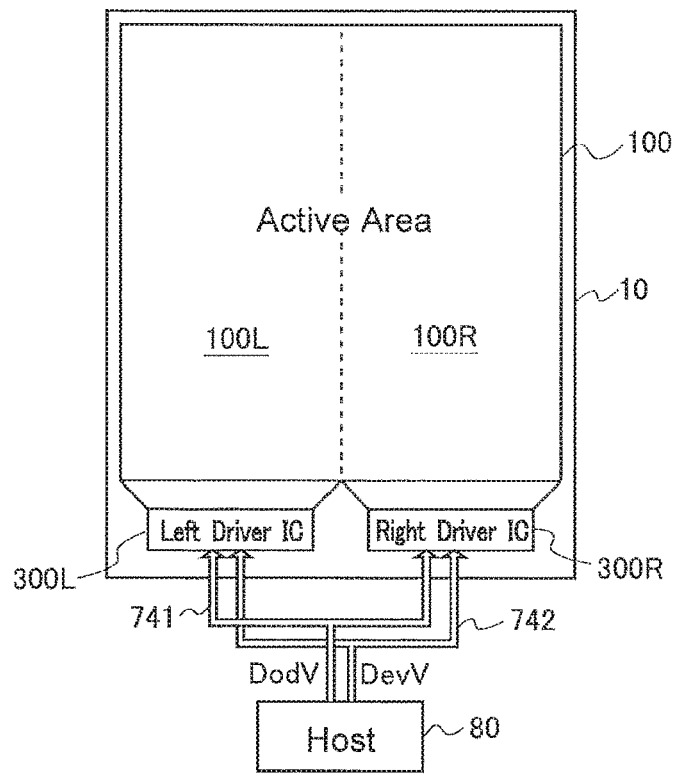
FIG. 26 is a diagram showing a whole configuration of a liquid crystal display device according to a fourth embodiment of the present invention.

FIG. 26 is a diagram showing a whole configuration of a liquid crystal display device according to a fourth embodiment of the present invention. This liquid crystal display device has a similar configuration to that of the second embodiment except for the configuration concerning connection with the host 80. For this reason, the same or corresponding part is provided with the same reference numeral, a detailed description concerning the present embodiment is omitted, and hereinafter, a description is focused on a different part from the second embodiment. In addition, similarly to the first and second embodiments, the present embodiment is configured so as to be able to perform pause drive (see FIG. 8).

(The ICON in) each of both the left and right driver ICs 300L, 300R in the present embodiment is also connected with the host 80 by the previously described appropriate interface, such as the interface conforming to MIPI-DSI standard. Further, also in the present embodiment, similarly to the second embodiment, one-screen data corresponding to a whole image to be displayed on the display portion (active area) 100, namely an image for one screen is transferred to the left and right driver ICs 300L, 300R in accordance with the interface. However, in the present embodiment, two-system data paths for dividing one-screen data into two half-screen data and transferring the half-screen data from the host 80 to the left and right driver ICs 300L, 300R are formed based on the formed interface. One of the two-system data paths is a data path (hereinafter referred to as an "odd sub data path") 741 for transferring odd row data DodV out of the odd row data DodV and even row data DevH corresponding to two images obtained by vertically dividing the one-screen image into two images by use of odd and even numbers, and the other is a data path (hereinafter referred to as an "even sub data path") 742 for transferring the even row data DevV. Herein, the "odd row data DodV" corresponds to an image made up of odd-numbered pixel rows in a pixel matrix constituting the one-screen image, and the "even row data DevV" corresponds to an image made up of even-numbered pixel rows in the pixel matrix. Further, the "pixel row" means a row made up of pixels aligned in a horizontal direction, namely an extending direction of the gate line. In the present embodiment, each of the driver ICs 300L, 300R receives the odd row data DodV via the odd sub data path 741, and receives the even row data DevV via the even sub data path 742, whereby input data for each two-line data corresponding to two pixel rows aligned along the gate line in the pixel matrix can be provided from the outside.

As described above, in the present embodiment, the odd row data DodV and the even row data DevV based on the vertical division are respectively transferred through the odd sub data path 741 and the even sub data path 742. That is, data corresponding to an odd-numbered pixel row and data corresponding to an even-numbered pixel row are transferred in parallel with each other to both the left and right driver ICs 300L, 300R through the two-system data paths. Similarly to the above first to third embodiments, since each driver IC 300L, 300R in the present embodiment includes the 1/2 RAM as a rewritable memory for temporarily storing display image data received from the host 80, from among the odd row data DodV and the even row data DevV transferred in parallel through the two-system data paths, data constituting left-half data DaL is stored in the 1/2 RAM of the left driver IC 300L as drive data and data constituting right-half data DaR is stored in the 1/2 RAM of the right driver IC 300R as drive data.

As described above, the present embodiment is similar to the second embodiment in that the one-screen data is transferred to the left and right driver ICs 300L, 300R, but is advantageous in that an operation frequency for data transfer is low due to the use of the two-system data paths 731, 732 for transfer of the one-screen data.

The present embodiment has a configuration as described below so as to synchronize refresh performed by the left driver IC 300L and refresh performed by the right driver IC 300R.

<4.1 First Configuration Example for Synchronizing Refresh>

Figure 27:
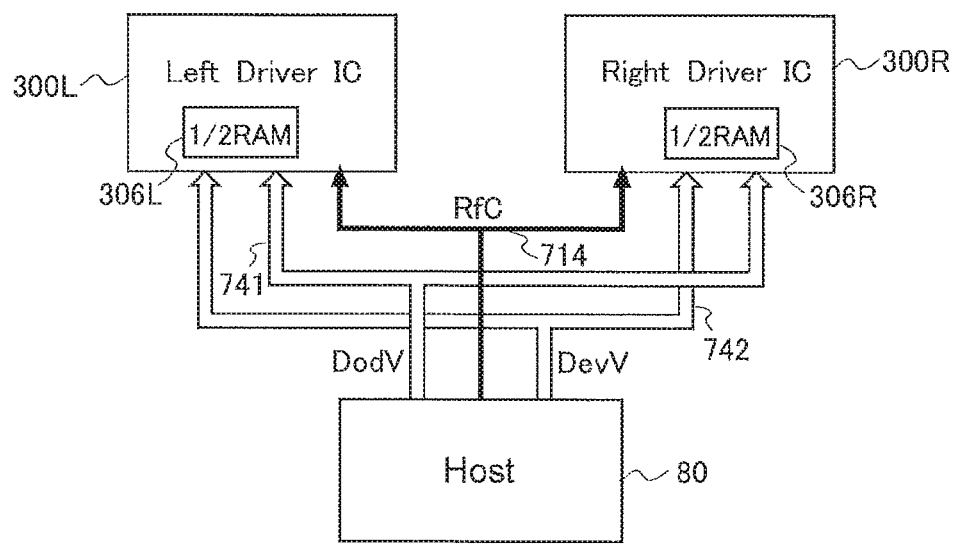
FIG. 27 is a block diagram showing a first configuration example for synchronizing refresh in the fourth embodiment.

FIG. 27 is a block diagram showing a first configuration example for synchronizing refresh in the present embodiment. In the present configuration example, the previously described two-system data paths, namely the odd sub data path 741 and the even sub data path 742 are formed between the host 80 and the left and right driver ICs 300L, 300R. Except for these respects, the present configuration example has a similar configuration to that of the first configuration example (FIG. 15) in the second embodiment. Accordingly, in the present configuration example, the same part as that in the first configuration example of the second embodiment is provided with the same reference numeral, and a detailed description thereof is omitted.

When the image update is to be performed, refresh data that is one-screen data for displaying a new image by the image update is divided into the odd row data DodV and the even row data DevV, and then transferred to the left and right driver ICs 300L, 300R through the odd sub data path 741 and the even sub data path 742, and the refresh control signal RfC instructing starting of refresh of the display image in the active area 100 based on this refresh data is transferred from the host 80 to the left and right driver ICs 300L, 300R. Each of both the left and right driver ICs 300L, 300R receives one-screen data made up of the odd row data DodV and the even row data DevV, and receives the refresh control signal RfC. As described above, the present embodiment is similar to the second embodiment in that each of both the left and right driver ICs 300L, 300R receives the one-screen data, and hence the operation of each of the left and right driver ICs 300L, 300R in the present configuration example hereinafter is basically similar to that in the first configuration example (FIG. 15) of the second embodiment. It is to be noted that, in the present configuration example, it is necessary to adjust the timings for reception of the odd row data DodV and the even row data DevV which are based on the vertical division and are transferred in parallel through the two-system data paths and for drive of the source line in the active area 100, and the timing adjustment is performed by the 1/2 RAMs 306L, 306R. This also applies to the other configuration examples in the present embodiment.

According to the present configuration example as thus described, a similar effect to that of the first configuration example of the second embodiment is exerted, and even when the display portion 100 is driven by the two driver ICs 300L, 300R as in the present embodiment, abnormality such as display misalignment does not occur.

<4.2 Second Configuration Example for Synchronizing Refresh>

Figure 28:
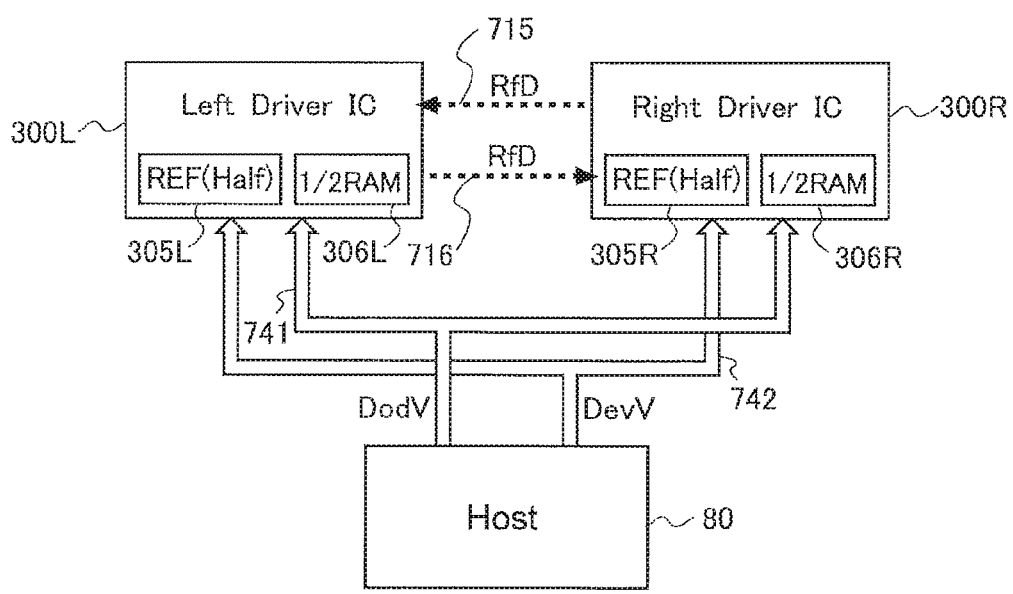
FIG. 28 is a block diagram showing a second configuration example for synchronizing refresh in the fourth embodiment.

FIG. 28 is a block diagram showing a second configuration example for synchronizing refresh in the present embodiment. The present configuration example has a similar configuration to that of the second configuration example (FIG. 16) in the second embodiment except that the previously described two-system data paths, namely the odd sub data path 741 and the even sub data path 742 are formed between the host 80 and the left and right driver ICs 300L, 300R. Accordingly, in the present configuration example, the same part as that in the second configuration example of the second embodiment is provided with the same reference numeral, and a detailed description thereof is omitted.

When the image update is to be performed, the left and right driver ICs 300L, 300R receive the odd row data DodV and the even row data DevV constituting refresh data that is one-screen data for displaying a new image by the image update. As described above, the present embodiment is similar to the second embodiment in that each of both the left and right driver ICs 300L, 300R receives the one-screen data, and hence the operation of each of the left and right driver ICs 300L, 300R in the present configuration example hereinafter is similar to that in the second configuration example (FIG. 16) of the second embodiment.

According to the present configuration example as thus described, a similar effect to that of the second configuration example of the second embodiment is exerted, and even when the display portion 100 is driven by the two driver ICs 300L, 300R as in the present embodiment, abnormality such as display misalignment does not occur.

<4.3 Third Configuration Example for Synchronizing Refresh>

Figure 29:
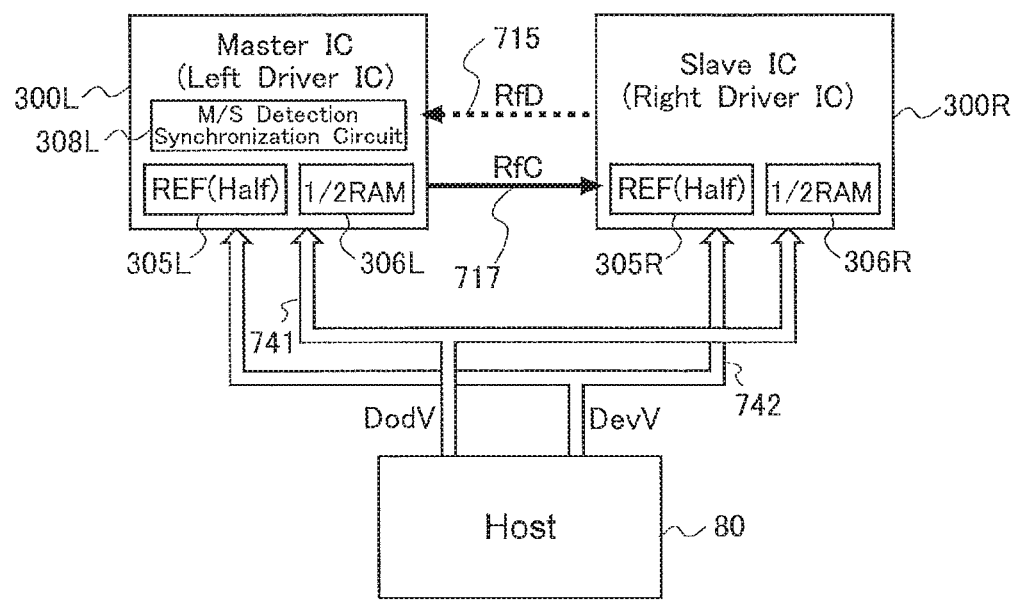
FIG. 29 is a block diagram showing a third configuration example for synchronizing refresh in the fourth embodiment.

FIG. 29 is a block diagram showing a third configuration example for synchronizing refresh in the present embodiment. The present configuration example has a similar configuration to that of the third configuration example (FIG. 17) in the second embodiment except that the previously described two-system data paths, namely the odd sub data path 741 and the even sub data path 742 are formed between the host 80 and the left and right driver ICs 300L, 300R. Accordingly, in the present configuration example, the same part as that in the third configuration example of the second embodiment is provided with the same reference numeral, and a detailed description thereof is omitted.

When the image update is to be performed, the left and right driver ICs 300L, 300R receive the odd row data DodV and the even row data DevV constituting refresh data that is one-screen data for displaying a new image by the image update. As described above, the present embodiment is similar to the second embodiment in that each of both the left and right driver ICs 300L, 300R receives the one-screen data, and hence the operation of each of the left and right driver ICs 300L, 300R in the present configuration example hereinafter is similar to that in the third configuration example (FIG. 17) of the second embodiment.

According to the present configuration example as thus described, a similar effect to that of the third configuration example of the second embodiment is exerted, and even when the display portion 100 is driven by the two driver ICs 300L, 300R as in the present embodiment, abnormality such as display misalignment does not occur.

<4.4 Fourth Configuration Example for Synchronizing Refresh>

Figure 30:
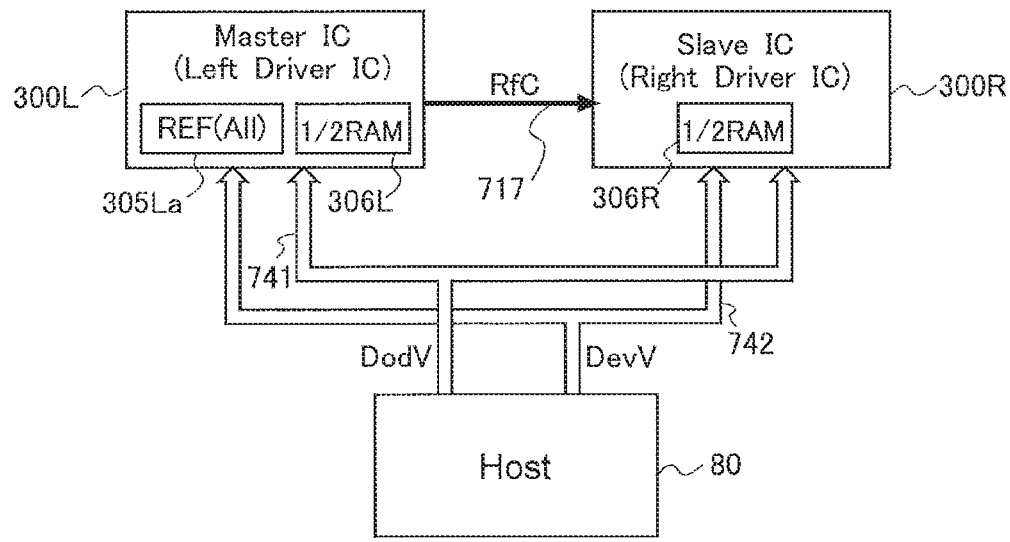
FIG. 30 is a block diagram showing a fourth configuration example for synchronizing refresh in the fourth embodiment.

FIG. 30 is a block diagram showing a fourth configuration example for synchronizing refresh in the present embodiment. The present configuration example has a similar configuration to that of the fourth configuration example (FIG. 18) in the second embodiment except that the previously described two-system data paths, namely the odd sub data path 741 and the even sub data path 742 are formed between the host 80 and the left and right driver ICs 300L, 300R. Accordingly, in the present configuration example, the same part as that in the fourth configuration example of the second embodiment is provided with the same reference numeral, and a detailed description thereof is omitted.

When the image update is to be performed, the left and right driver ICs 300L, 300R receive the odd row data DodV and the even row data DevV constituting refresh data that is one-screen data for displaying a new image by the image update. As described above, the present embodiment is similar to the second embodiment in that each of both the left and right driver ICs 300L, 300R receives the one-screen data, and hence the operation of each of the left and right driver ICs 300L, 300R in the present configuration example hereinafter is similar to that in the fourth configuration example (FIG. 18) of the second embodiment.

According to the present configuration example as thus described, a similar effect to that of the fourth configuration example of the second embodiment is exerted, and even when the display portion 100 is driven by the two driver ICs 300L, 300R as in the present embodiment, abnormality such as display misalignment does not occur.

<4.5 Fifth Configuration Example for Synchronizing Refresh>

Figure 31:
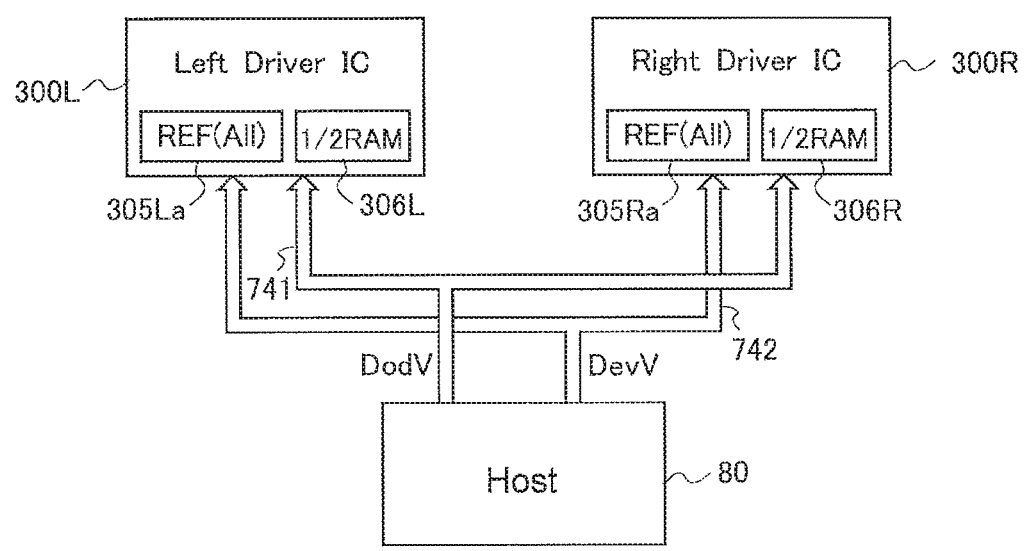
FIG. 31 is a block diagram showing a fifth configuration example for synchronizing refresh in the fourth embodiment.

FIG. 31 is a block diagram showing a fifth configuration example for synchronizing refresh in the present embodiment. The present configuration example has a similar configuration to that of the fifth configuration example (FIG. 19) in the second embodiment except that the previously described two-system data paths, namely the odd sub data path 741 and the even sub data path 742 are formed between the host 80 and the left and right driver ICs 300L, 300R. Accordingly, in the present configuration example, the same part as that in the fifth configuration example of the second embodiment is provided with the same reference numeral, and a detailed description thereof is omitted.

When the image update is to be performed, the left and right driver ICs 300L, 300R receive the odd row data DodV and the even row data DevV constituting refresh data that is one-screen data for displaying a new image by the image update. As described above, the present embodiment is similar to the second embodiment in that each of both the left and right driver ICs 300L, 300R receives the one-screen data, and hence the operation of each of the left and right driver ICs 300L, 300R in the present configuration example hereinafter is similar to that in the fifth configuration example (FIG. 19) of the second embodiment.

According to the present configuration example as thus described, a similar effect to that of the fifth configuration example of the second embodiment is exerted, and even when the display portion 100 is driven by the two driver ICs 300L, 300R as in the present embodiment, abnormality such as display misalignment does not occur.

<4.6 Effect of Fourth Embodiment>

According to the present embodiment as described above, similarly to the first embodiment, since the refresh operation on the left active area 100L by the left driver IC (the master IC) 300L and the refresh operation on the right active area 100R by the right drive IC (the slave IC) 300R are performed in synchronization with each other, abnormality such as display misalignment does not occur even when the display portion 100 is driven by the two driver ICs 300L, 300R. Hence in the liquid crystal display device that performs pause drive, the display portion 100 is driven by the two driver ICs 300L, 300R to enable favorable display of a high-resolution image.

Further, also in the present embodiment, similarly to the first embodiment, since the display portion 100 is driven based on the drive data stored in the rewritable memories (the 1/2 RAMs), the following effect is obtained: without being provided with any control signals indicating display timing from the host 80, each driver IC can generate such a control signal therein. Moreover, even if only a portion of one-screen data Da is provided from the host 80 as refresh data to update only a portion of the display image, the refresh operation are performed on the whole display portion 100 by the driver ICs 300L, 300R.

5. Modified Example

In each of the above embodiments, the description has been given focusing on refresh of a display image in the case of forcible image update during the non-refresh period on the assumption that pause drive is performed, but the present invention is also applicable to refresh other than such refresh. For example, the present invention is also applicable to forcible refresh that is performed for displaying a new image in the midst of a refresh period, and applicable to regular refresh. Also in the regular refresh, when the timings for refresh is shifted for some reason between, for example, the two driver ICs that drive the display portion (the left driver IC 300L and the right driver IC 300R in each of the above embodiments) (e.g., when the timing for data transfer for refresh is shifted), according to the present invention, the refresh is not performed by either of the driver ICs alone, but the refresh is certainly started by both of the driver ICs at the same timing.

Figure 6:
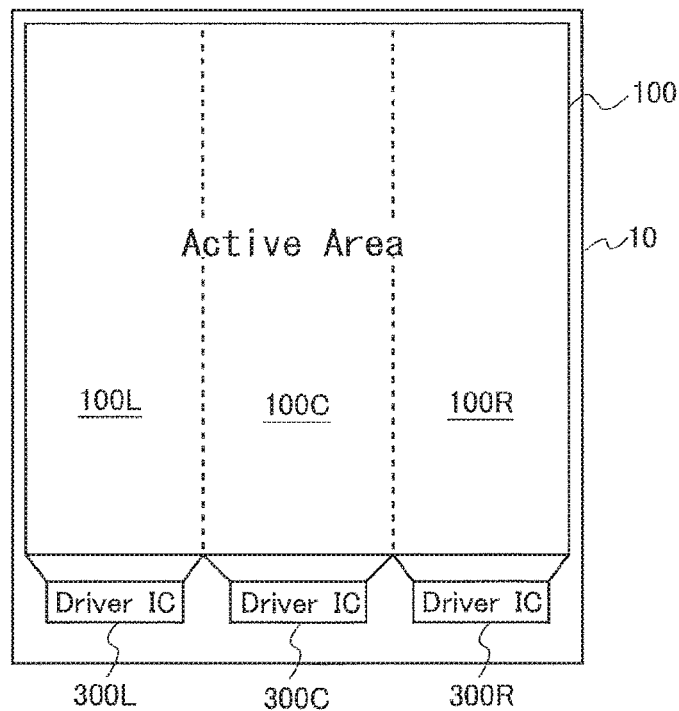
FIG. 6 is a diagram showing a schematic configuration of a liquid crystal display device using three driver ICs.

Further, in each of the above embodiments, the display portion (active area) 100 is driven using the two driver ICs 300L, 300R, but as seen from the descriptions of each of the above embodiments, the present invention is also applicable to the case of driving the display portion by use of three or more driver ICs (see FIG. 6). In addition, when three or more driver ICs are used in the configuration examples where the driver ICs for driving the display portion are of two types respectively identified as the master IC and the slave IC (see FIGS. 11, 17, 23, 29), the configuration can be made such that one IC of the three or more driver ICs is the master IC, and the other ICs are all slave ICs.

Further, in each of the above embodiments, the configuration can be made such that the display portion (source lines in the active area) is shared and driven by a plurality of driver ICs as shown in FIGS. 2 to 4, but the present invention is not limited to such drive performed by a plurality of driver ICs. The present invention is applicable to any display device including a plurality of drive control circuits that share and drive data signal lines (source lines) in the display portion, each drive control circuit including a drive circuit (SD: source driver) for generating data signals to be applied to the data signal lines, and a control circuit (TCON: timing controller) for generating a signal to control the drive circuit.

Further, in each of the above embodiments, although each driver IC 300L, 300R includes the 1/2 RAM (RAM having storage capacity for storing data for displaying a half-screen image) as a memory for temporarily storing display image data received from the host 80, one-screen data is transferred from the host 80 to each driver IC 300L, 300R in the above second to fourth embodiments (see FIGS. 14, 20, 26, etc.). Accordingly, the above second to fourth embodiments may be configured such that each driver IC 300L, 300R includes 2/2 RAM (RAM having storage capacity for storing data for displaying one-screen image) instead of the 1/2 RAM, and temporarily stores the one-screen data in the 2/2 RAM. Such a configuration enables accurate detection of the start timing for refresh by using the 2/2 RAM to detect the start timing in each REF (All) in the fourth and fifth configuration examples of the above second to fourth embodiments. Moreover, such a configuration enables image processing employing the previously described CABC (Content Adaptive Brightness Control) technique or the like, and allows a technique based on the image processing to be used to detect the start timing for the refresh.

It is to be noted that in each of the above embodiments, the description has been given by taking the liquid crystal display device for performing pause drive as an example, but the present invention is not limited thereto. The present invention is also applicable to another display device, such as an organic EL (Electro Luminescence) display device, so long as being a display device that performs pause drive.

INDUSTRIAL APPLICABILITY

The present invention is applicable to a display device that performs pause drive by using a plurality of driver ICs, and applicable to a method for driving the display device.

DESCRIPTION OF REFERENCE CHARACTERS

10: LIQUID CRYSTAL DISPLAY PANEL
80: HOST
100: DISPLAY PORTION (ACTIVE AREA)
100L: LEFT ACTIVE AREA (SUB DISPLAY AREA)
100R: RIGHT ACTIVE AREA (SUB DISPLAY AREA)
300L: LEFT DRIVER IC (MASTER IC)
300R: RIGHT DRIVER IC (SLAVE IC)
305L, 305R: REFRESH DETECTION PORTION FOR HALF SCREEN (REF (Half))
305La, 305Ra: REFRESH DETECTION PORTION FOR ONE SCREEN (REF (All))
306L, 306R: 1/2 RAM (MEMORY)
308L: M/S detection synchronization circuit
711: LEFT SUB DATA PATH
712: RIGHT SUB DATA PATH
714: CONTROL SIGNAL PATH
715: FIRST SIGNAL PATH
716: SECOND SIGNAL PATH
717: THIRD SIGNAL PATH
720: DATA PATH
731,741: ODD SUB DATA PATH
732,742: EVEN SUB DATA PATH
Da: ONE-SCREEN DATA
DaL: LEFT-HALF DATA
DaR: RIGHT-HALF DATA
DodH: ODD COLUMN DATA (BASED ON HORIZONTAL DIVISION)
DevH: EVEN COLUMN DATA (BASED ON HORIZONTAL DIVISION)
DodV: ODD ROW DATA (BASED ON VERTICAL DIVISION)

DevV: EVEN ROW DATA (BASED ON VERTICAL DIVISION)
RfC: REFRESH CONTROL SIGNAL (REFRESH START INFORMATION)
RfD, RfDl, RfDr: REFRESH DETECTION SIGNAL (REFRESH START INFORMATION)

The invention claimed is:

1. A display device for displaying an image based on input data provided from outside, the device comprising:
   a display that displays the image;
   a drive controller that drives the display based on the input data so as to alternate between a refresh period in which a display image on the display is refreshed and a non-refresh period in which refresh of the display image on the display is paused; and
   a data path that provides the input data from the outside to the drive controller,
   wherein
   the drive controller includes a plurality of drive control circuits that respectively correspond to a plurality of sub display areas obtained by dividing a display area of the display,
   each of the drive control circuits includes a rewritable memory, and a refresh detector that detects refresh start timing for the display image on the display based on data to display an image in the corresponding sub display area from among the input data
   the data path includes a plurality of sub data paths respectively corresponding to the plurality of sub display areas,
   each of the drive control circuits receives, as sub input data from among the input data, data to display an image in the corresponding sub display area from the outside via the sub data path corresponding to the sub display area concerned, and stores the received sub input data in the memory as the drive data,
   the plurality of drive control circuits include one drive control circuit identified as a master drive control circuit, and a drive control circuit which is other than the master drive control circuit and identified as a slave drive control circuit,
   a signal path is provided between the master drive control circuit and the slave drive control circuit,
   upon detection of the refresh start timing by the refresh detector, the slave drive control circuit transmits a refresh detection signal indicating the refresh start timing as refresh start information to the master drive control circuit via the signal path,
   upon detection of the refresh start timing by the refresh detector, or upon receipt of the refresh detection signal from the slave drive control circuit via the signal path, the master drive control circuit transmits a refresh control signal instructing starting of the refresh as the refresh start information to the slave drive control circuit via the signal path, and drives the display such that refresh of the display image in the corresponding sub display area is started based on the drive data stored in the memory in the master drive control circuit, and
   upon receipt of the refresh control signal from the master drive control circuit via the signal path, the slave drive control circuit drives the display such that refresh of the display image in the corresponding sub display area is started based on the drive data stored in the memory in the slave drive control circuit.

2. The display device according to claim 1, wherein
the display includes:
   a plurality of data signal lines;
   a plurality of scanning signal lines that intersect with the plurality of data signal lines; and
   a plurality of pixel formation portions arranged in a matrix form along the plurality of data signal lines and the plurality of scanning signal lines,
each of the pixel formation portions is connected to any one of the plurality of data signal lines and connected to any one of the plurality of scanning signal lines,
the drive controller drives the plurality of data signal lines and the plurality of scanning signal lines such that an image is displayed by the plurality of pixel formation portions based on the input data,
the data path includes:
   an odd sub data path to transfer, as odd column data from among the input data, data corresponding to an odd-numbered pixel column made up of pixels aligned along each of the data signal lines in a pixel matrix constituting an image to be displayed by the plurality of pixel formation portions, from the outside to each of the drive control circuits, and
   an even sub data path to transfer, as even column data from among the input data, data corresponding to an even-numbered pixel column made up of pixels aligned along each of the data signal lines in the pixel matrix, from the outside to each of the drive control circuits, and
each of the drive control circuits receives the odd column data from the outside via the odd sub data path, and receives the even column data from the outside via the even sub data path, thereby being provided from the outside with the input data for each one-line data corresponding to one pixel row made up of pixels aligned along each of the scanning signal lines in the pixel matrix.

3. The display device according to claim 1, wherein
the display includes:
   a plurality of data signal lines;
   a plurality of scanning signal lines that intersect with the plurality of data signal lines; and
   a plurality of pixel formation portions arranged in a matrix form along the plurality of data signal lines and the plurality of scanning signal lines,
each of the pixel formation portions is connected to any one of the plurality of data signal lines and connected to any one of the plurality of scanning signal lines,
the drive controller drives the plurality of data signal lines and the plurality of scanning signal lines such that an image is displayed by the plurality of pixel formation portions based on the input data,
the data path includes:
   an odd sub data path to transfer, as odd row data from among the input data, data corresponding to an odd-numbered pixel row made up of pixels aligned along each of the scanning signal lines in a pixel matrix constituting an image to be displayed by the plurality of pixel formation portions, from the outside to each of the drive control circuits, and
   an even sub data path to transfer, as even row data from among the input data, data corresponding to an even-numbered pixel row made up of pixels aligned along each of the scanning signal lines in the pixel matrix, from the outside to each of the drive control circuits, and each of the drive control circuits
  receives the odd row data from the outside via the odd sub data path, and receives the even row data from the outside via the even sub data path, thereby being provided from the outside with the input data for each two-line data corresponding to two pixel rows made up of pixels aligned along each of the scanning signal lines in the pixel matrix.

4. The display device according to claim 1, wherein when receiving the input data from the outside, each of the drive control circuits stores, in the memory as the drive data, data to display an image in the corresponding sub display area from among the input data.

5. The display device according to claim 1, wherein when receiving the input data from the outside, each of the drive control circuits stores the input data in the memory as the drive data.

6. The display device according to claim 1, wherein each of the drive control circuits is configured as a single IC chip.

7. The display device according to claim 1, wherein the display includes a thin film transistor including a channel layer made of an oxide semiconductor, as a switching element that defines each pixel constituting an image to be displayed.

8. A display device for displaying an image based on input data provided from outside, the device comprising:
  a display that displays the image;
  a drive controller that drives the display based on the input data so as to alternate between a refresh period in which a display image on the display is refreshed and a non-refresh period in which refresh of the display image on the display is paused; and
  a data path that provides the input data from the outside to the drive controller,
  wherein
  the drive controller includes a plurality of drive control circuits that respectively correspond to a plurality of sub display areas obtained by dividing a display area of the display,
  each of the drive control circuits includes a rewritable memory,
  each of the drive control circuits receives the input data from the outside via the data path, and stores in the memory as drive data at least data to display an image in a sub display area corresponding to the relevant drive control circuit from among the received data,
  the plurality of drive control circuits include one drive control circuit identified as a master drive control circuit, and a drive control circuit which is other than the master drive control circuit and identified as a slave drive control circuit,
  a signal path is provided between the master drive control circuit and the slave drive control circuit,
  the master drive control circuit includes a refresh detector that detects refresh start timing for the display image on the display based on the input data,
  upon detection of the refresh start timing by the refresh detector, the master drive control circuit transmits a refresh control signal instructing starting of the refresh as the refresh start information to the slave drive control circuit via the signal path, and drives the display such that refresh of the display image in the corresponding sub display area is started based on the drive data stored in the memory in the master drive control circuit, and
  upon receipt of the refresh control signal from the master drive control circuit via the signal path, the slave drive control circuit drives the display such that refresh of the display image in the corresponding sub display area is started based on the drive data stored in the memory in the slave drive control circuit.

9. The display device according to claim 8, wherein the display includes:
  a plurality of data signal lines;
  a plurality of scanning signal lines that intersect with the plurality of data signal lines; and
  a plurality of pixel formation portions arranged in a matrix form along the plurality of data signal lines and the plurality of scanning signal lines,
  each of the pixel formation portions is connected to any one of the plurality of data signal lines and connected to any one of the plurality of scanning signal lines,
  the drive controller drives the plurality of data signal lines and the plurality of scanning signal lines such that an image is displayed by the plurality of pixel formation portions based on the input data,
  the data path includes:
    an odd sub data path that transfers, as odd column data from among the input data, data corresponding to an odd-numbered pixel column made up of pixels aligned along each of the data signal lines in a pixel matrix constituting an image to be displayed by the plurality of pixel formation portions, from the outside to each of the drive control circuits, and
    an even sub data path that transfers, as even column data from among the input data, data corresponding to an even-numbered pixel column made up of pixels aligned along each of the data signal lines in the pixel matrix, from the outside to each of the drive control circuits, and
  each of the drive control circuits receives the odd column data from the outside via the odd sub data path, and receives the even column data from the outside via the even sub data path, thereby being provided from the outside with the input data for each one-line data corresponding to one pixel row made up of pixels aligned along each of the scanning signal lines in the pixel matrix.

10. The display device according to claim 8, wherein the display includes:
  a plurality of data signal lines;
  a plurality of scanning signal lines that intersect with the plurality of data signal lines; and
  a plurality of pixel formation portions arranged in a matrix form along the plurality of data signal lines and the plurality of scanning signal lines,
  each of the pixel formation portions is connected to any one of the plurality of data signal lines and connected to any one of the plurality of scanning signal lines,
  the drive controller drives the plurality of data signal lines and the plurality of scanning signal lines such that an image is displayed by the plurality of pixel formation portions based on the input data,
  the data path includes:
    an odd sub data path to transfer, as odd row data from among the input data, data corresponding to an odd-numbered pixel row made up of pixels aligned along each of the scanning signal lines in a pixel matrix constituting an image to be displayed by the plurality of pixel formation portions, from the outside to each of the drive control circuits, and
    an even sub data path to transfer, as even row data from among the input data, data corresponding to an even-numbered pixel row made up of pixels aligned along each of the scanning signal lines in the pixel matrix, from the outside to each of the drive control circuits, and each of the drive control circuits receives the odd row data from the outside via the odd sub data path, and receives the even row data from the outside via the even sub data path, thereby being provided from the outside with the input data for each two-line data corresponding to two pixel rows made up of pixels aligned along each of the scanning signal lines in the pixel matrix.

11. The display device according to claim 8, wherein when receiving the input data from the outside, each of the drive control circuits stores, in the memory as the drive data, data to display an image in the corresponding sub display area from among the input data.

12. The display device according to claim 8, wherein when receiving the input data from the outside, each of the drive control circuits stores the input data in the memory as the drive data.

13. The display device according to claim 8, wherein each of the drive control circuits is configured as a single IC chip.

14. The display device according to claim 8, wherein the display includes a thin film transistor including a channel layer made of an oxide semiconductor, as a switching element that defines each pixel constituting an image to be displayed.

15. A display device for displaying an image based on input data provided from outside, the device comprising:
a display that displays the image;
a drive controller that drives the display based on the input data so as to alternate between a refresh period in which a display image on the display is refreshed and a non-refresh period in which refresh of the display image on the display is paused, the drive controller including a plurality of drive control circuits that respectively correspond to a plurality of sub display areas obtained by dividing a display area of the display; and
a data path that provides the input data from the outside to the drive controller,
a signal path that connects the plurality of drive control circuits to each other,
wherein
each of the drive control circuits includes a rewritable memory, and a refresh detector that detects refresh start timing for the display image on the display based on data to display an image in the corresponding sub display area from among the input data,
the data path includes a plurality of sub data paths respectively corresponding to the plurality of sub display areas,
each of the drive control circuits receives, as sub input data from among the input data, data to display an image in the corresponding sub display area from the outside via the sub data path corresponding to the sub display area concerned, and stores the received sub input data in the memory as the drive data,
upon detection of the refresh start timing by the refresh detector, each of the drive control circuits transmits a refresh detection signal indicating the refresh start timing as refresh start information to the other drive control circuit via the signal path, and drives the display such that refresh of the display image in the corresponding sub display area is started based on the drive data stored in the memory in the relevant drive control circuit, and upon receipt of the refresh detection signal from any of the other drive control circuits via the signal path, each of the drive control circuits drives the display such that refresh of the display image in the corresponding sub display area is started based on the drive data stored in the memory in the relevant drive control circuit.

16. The display device according to claim 15, wherein the display includes:
a plurality of data signal lines;
a plurality of scanning signal lines that intersect with the plurality of data signal lines; and
a plurality of pixel formation portions arranged in a matrix form along the plurality of data signal lines and the plurality of scanning signal lines,
each of the pixel formation portions is connected to any one of the plurality of data signal lines and connected to any one of the plurality of scanning signal lines,
the drive controller drives the plurality of data signal lines and the plurality of scanning signal lines such that an image is displayed by the plurality of pixel formation portions based on the input data,
the data path includes:
an odd sub data path to transfer, as odd column data from among the input data, data corresponding to an odd-numbered pixel column made up of pixels aligned along each of the data signal lines in a pixel matrix constituting an image to be displayed by the plurality of pixel formation portions, from the outside to each of the drive control circuits, and
an even sub data path to transfer, as even column data from among the input data, data corresponding to an even-numbered pixel column made up of pixels aligned along each of the data signal lines in the pixel matrix, from the outside to each of the drive control circuits, and
each of the drive control circuits receives the odd column data from the outside via the odd sub data path, and receives the even column data from the outside via the even sub data path, thereby being provided from the outside with the input data for each one-line data corresponding to one pixel row made up of pixels aligned along each of the scanning signal lines in the pixel matrix.

17. The display device according to claim 15, wherein the display includes:
a plurality of data signal lines;
a plurality of scanning signal lines that intersect with the plurality of data signal lines; and
a plurality of pixel formation portions arranged in a matrix form along the plurality of data signal lines and the plurality of scanning signal lines,
each of the pixel formation portions is connected to any one of the plurality of data signal lines and connected to any one of the plurality of scanning signal lines,
the drive controller drives the plurality of data signal lines and the plurality of scanning signal lines such that an image is displayed by the plurality of pixel formation portions based on the input data,
the data path includes:
an odd sub data path to transfer, as odd row data from among the input data, data corresponding to an odd-numbered pixel row made up of pixels aligned along each of the scanning signal lines in a pixel matrix constituting an image to be displayed by the plurality of pixel formation portions, from the outside to each of the drive control circuits, and an even sub data path to transfer, as even row data from among the input data, data corresponding to an even-numbered pixel row made up of pixels aligned along each of the scanning signal lines in the pixel matrix, from the outside to each of the drive control circuits, and each of the drive control circuits receives the odd row data from the outside via the odd sub data path, and receives the even row data from the outside via the even sub data path, thereby being provided from the outside with the input data for each two-line data corresponding to two pixel rows made up of pixels aligned along each of the scanning signal lines in the pixel matrix.

18. The display device according to claim 15, wherein when receiving the input data from the outside, each of the drive control circuits stores, in the memory as the drive data, data to display an image in the corresponding sub display area from among the input data.

19. The display device according to claim 15, wherein when receiving the input data from the outside, each of the drive control circuits stores the input data in the memory as the drive data.

* * * * *